US012456431B2

(12) United States Patent
Kim et al.

(10) Patent No.: US 12,456,431 B2
(45) Date of Patent: Oct. 28, 2025

(54) DISPLAY DEVICE

(71) Applicant: Samsung Display Co., Ltd., Yongin-Si (KR)

(72) Inventors: Hyuk Kim, Yongin-si (KR); Boyong Chung, Yongin-si (KR); Jonghee Kim, Yongin-si (KR); Doo-Young Lee, Yongin-si (KR); Tak-Young Lee, Yongin-si (KR); Sang-Uk Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 330 days.

(21) Appl. No.: 18/212,512

(22) Filed: Jun. 21, 2023

(65) Prior Publication Data

US 2024/0161701 A1 May 16, 2024

(30) Foreign Application Priority Data

Nov. 16, 2022 (KR) ........................ 10-2022-0153434

(51) Int. Cl.
*G09G 3/3266* (2016.01)

(52) U.S. Cl.
CPC ... *G09G 3/3266* (2013.01); *G09G 2300/0426* (2013.01); *G09G 2310/08* (2013.01); *G09G 2320/0233* (2013.01)

(58) Field of Classification Search
CPC ......... G09G 3/3266; G09G 2300/0426; G09G 2310/08; G09G 2320/0233
USPC ........................................................... 345/76
See application file for complete search history.

(56) References Cited

FOREIGN PATENT DOCUMENTS

KR 10-2018-0127896 A 11/2018
KR 20180127896 A * 11/2018 ........... G09G 3/3233

* cited by examiner

*Primary Examiner* — Mark Edwards
(74) *Attorney, Agent, or Firm* — Innovation Counsel LLP

(57) ABSTRACT

A display device includes a display panel and a gate driver. The gate driver includes an N-th stage (where N is a natural number) configured to output an N-th scan gate signal and output an N-th sensing gate signal. The N-th stage includes a compensator, a sixth transistor including a control electrode connected to a first node, and a ninth transistor including a control electrode connected to the first node. In a variable frequency mode, the compensator outputs a second signal to the first node in response to a first signal, and the sixth transistor does not output the N-th scan gate signal when the ninth transistor outputs the N-th sensing gate signal based on the sensing clock signal, the voltage of the first node, and the voltage of the second node.

20 Claims, 16 Drawing Sheets

DISPLAY DEVICE

This application claims priority to Korean Patent Application No. 10-2022-0153434, filed on Nov. 16, 2022, and all the benefits accruing therefrom under 35 U.S.C. § 119, the content of which in its entirety is herein incorporated by reference.

BACKGROUND

1. Field

Embodiments of the present inventive concept relate to a display device. More particularly, embodiments of the present inventive concept relate to a display device operating in a variable frequency mode.

2. Description of the Related Art

Generally, a display device may include a display panel and a display panel driver. The display panel may include gate lines, data lines, and pixels. The display panel driver may include a gate driver providing gate signals to the gate lines, a data driver providing data voltages to the data lines, and a driving controller controlling the gate driver and the data driver.

However, in the display device operating in a variable frequency mode, a luminance of the display panel driven at a first driving frequency may be different from a luminance of the display panel driven at a second driving frequency. Accordingly, flicker may occur when driving frequencies of the display panel is changed.

SUMMARY

Embodiments of the present inventive concept provide a display device displaying images with uniform luminance at different driving frequencies.

Embodiments of the present inventive concept provide a display device displaying images with uniform luminance at different driving frequencies.

Embodiments of the present inventive concept provide a display device displaying images with uniform luminance at different driving frequencies.

In an embodiment of a display device according to the present inventive concept, a display device includes a display panel including pixels and a gate driver configured to apply scan gate signals and sensing gate signals to the pixels. the gate driver includes an N-th stage (where N is a natural number) configured to output an N-th scan gate signal among the scan gate signals based on a scan clock signal, a voltage of a first node, and a voltage of a second node, and output an N-th sensing gate signal among the sensing gate signals based on a sensing clock signal, the voltage of the first node, and the voltage of the second node, the N-th stage includes a compensator, a sixth transistor including a control electrode connected to the first node, and a ninth transistor including a control electrode connected to the first node, and, in a variable frequency mode, the compensator outputs a second signal to the first node in response to a first signal, and the sixth transistor does not output the N-th scan gate signal when the ninth transistor outputs the N-th sensing gate signal based on the sensing clock signal, the voltage of the first node, and the voltage of the second node.

In an embodiment, each of the pixels may include a first pixel switching element including a control electrode connected to a storage capacitor, a first electrode to which a first power supply voltage is applied, and a second electrode connected to a light emitting element, a second pixel switching element including a control electrode to which the scan gate signal is applied, a first electrode to which a data voltage is applied, and a second electrode connected to the control electrode of the first pixel switching element, a third pixel switching element including a control electrode to which the sensing gate signal is applied, a first electrode to which an initialization voltage is applied, and a second electrode connected to the light emitting element, the light emitting element including an anode connected to the second electrode of the first pixel switching element, and a cathode to which a second power supply voltage is applied, and the storage capacitor including a first electrode connected to the control electrode of the first pixel switching element, and a second electrode connected to the second electrode of the first pixel switching element.

In an embodiment, in the variable frequency mode, the gate driver may not apply the scan gate signal to the control electrode of the second pixel switching element when applying the sensing gate signal to the control electrode of the first pixel switching element.

In an embodiment, the gate driver may simultaneously apply the sensing gate signals to pixel rows in response to sensing clock signals.

In an embodiment, the compensator may include a 29-1 transistor and a 29-2 transistor, the 29-1 transistor may include a control electrode to which the first signal is applied, a first electrode connected to a second electrode of the 29-2 transistor, and a second electrode connected to the first node, and the 29-2 transistor may include a control electrode to which the first signal is applied, a first electrode to which the second signal is applied, and the second electrode connected to the first electrode of the 29-1 transistor.

In an embodiment, the second signal may be applied to the first node when the 29-1 transistor and the 29-2 transistor are turned on in response to the first signal.

In an embodiment, the N-th stage may further include a resetter, and the resetter outputs a first low voltage to the first node in response to a fifth signal.

In an embodiment of a display device according to the present inventive concept, a display device includes a display panel including pixels and a gate driver configured to apply scan gate signals and sensing gate signals to the pixels. The gate driver includes an N-th stage (where N is a natural number) configured to output an N-th scan gate signal among the scan gate signals based on a scan clock signal, a voltage of a first node, and a voltage of a second node, and output an N-th sensing gate signal among the sensing gate signals based on a sensing clock signal, the voltage of the first node, and the voltage of the second node, the N-th stage includes a compensator, a sixth transistor including a control electrode connected to the first node, and a ninth transistor including a control electrode connected to the first node, and, in a variable frequency mode, the compensator outputs a first signal to the first node in response to the first signal, and the sixth transistor does not output the N-th scan gate signal when the ninth transistor outputs the N-th sensing gate signal based on the sensing clock signal, the voltage of the first node, and the voltage of the second node.

In an embodiment, each of the pixels may include a first pixel switching element including a control electrode connected to a storage capacitor, a first electrode to which a first power supply voltage is applied, and a second electrode connected to a light emitting element, a second pixel switching element including a control electrode to which the scan gate signal is applied, a first electrode to which a data voltage is applied, and a second electrode connected to the control electrode of the first pixel switching element, a third pixel switching element including a control electrode to which the sensing gate signal is applied, a first electrode to which an initialization voltage is applied, and a second electrode connected to the light emitting element, the light emitting element including an anode connected to the second electrode of the first pixel switching element, and a cathode to which a second power supply voltage is applied, and the storage capacitor including a first electrode connected to the control electrode of the first pixel switching element, and a second electrode connected to the second electrode of the first pixel switching element.

In an embodiment, the compensator may include a 29-1 transistor and a 29-2 transistor, the 29-1 transistor may include a control electrode to which the first signal is applied, a first electrode connected to a second electrode of the 29-2 transistor, and a second electrode connected to the first node, the 29-2 transistor may include a control electrode to which the first signal is applied, a first electrode to which the first signal is applied, and the second electrode connected to the first electrode of the 29-1 transistor, an intermediate node of the 29-1 transistor and the 29-2 transistor is connected to an output electrode of a stabilizer, the stabilizer may include a 28-1 transistor and a 28-2 transistor, the 28-1 transistor may include a control electrode connected to the first node, a first electrode connected to a second electrode of the 28-2 transistor, and a second electrode connected to the output electrode of the stabilizer to which the intermediate node of the 29-1 transistor and the 29-2 transistor is connected, and the 28-2 transistor may include a control electrode connected to the first node, a first electrode to which a second signal is applied, and the second electrode connected to the first electrode of the 28-1 transistor.

In an embodiment, the compensator may include a 29-1 transistor and a 29-2 transistor, the 29-1 transistor may include a control electrode to which the first signal is applied, a first electrode connected to a second electrode of the 29-2 transistor, and a second electrode connected to the first node, the 29-2 transistor may include a control electrode to which the first signal is applied, a first electrode to which the first signal is applied, and the second electrode connected to the first electrode of the 29-1 transistor, and a second signal may be applied to an intermediate node of the 29-1 transistor and the 29-2 transistor.

In an embodiment, the compensator may further include a 30-1 transistor and a 30-2 transistor, the 30-1 transistor may include a control electrode connected to a second electrode of the 30-2 transistor, a first electrode connected to the second electrode of the 30-2 transistor, and a second electrode connected to the intermediate node of the 29-1 transistor and the 29-2 transistor, and the 30-2 transistor may include a control electrode to which the second signal is applied, a first electrode to which the second signal is applied, and the second electrode connected to the first electrode of the 30-1 transistor.

In an embodiment, the gate driver may sequentially apply the sensing gate signals to pixel rows in response to sensing clock signals.

In an embodiment of a display device according to the present inventive concept, a display device includes a display panel including pixels and a gate driver configured to apply scan gate signals and sensing gate signals to the pixels. the gate driver includes an N-th stage (where N is a natural number) configured to output an N-th scan gate signal among the scan gate signals based on a scan clock signal, a voltage of a first node, and a voltage of a second node, and output an N-th sensing gate signal among the sensing gate signals based on a sensing clock signal, the voltage of the first node, and the voltage of the second node, the N-th stage includes a resetter configured to output a first low voltage to the first node in response to a fifth signal, a sixth transistor including a control electrode connected to the first node, and a ninth transistor including a control electrode connected to the first node, and, in a variable frequency mode, the first low voltage has an activation pulse, and the sixth transistor does not output the N-th scan gate signal when the ninth transistor outputs an N-th sensing gate signal based on the sensing clock signal, the voltage of the first node, and the voltage of the second node.

In an embodiment, each of the pixels may include a first pixel switching element including a control electrode connected to a storage capacitor, a first electrode to which a first power supply voltage is applied, and a second electrode connected to a light emitting element, a second pixel switching element including a control electrode to which the scan gate signal is applied, a first electrode to which a data voltage is applied, and a second electrode connected to the control electrode of the first pixel switching element, a third pixel switching element including a control electrode to which the sensing gate signal is applied, a first electrode to which an initialization voltage is applied, and a second electrode connected to the light emitting element, the light emitting element including an anode connected to the second electrode of the first pixel switching element, and a cathode to which a second power supply voltage is applied, and the storage capacitor including a first electrode connected to the control electrode of the first pixel switching element, and a second electrode connected to the second electrode of the first pixel switching element.

In an embodiment, in the variable frequency mode, the gate driver may not apply the scan gate signal to the control electrode of the second pixel switching element when applying the sensing gate signal to the control electrode of the first pixel switching element.

In an embodiment, the gate driver may simultaneously apply the sensing gate signals to pixel rows in response to sensing clock signals.

In an embodiment, the resetter may include a 1-1 transistor and a 1-2 transistor, the 1-1 transistor may include a control electrode to which the fifth signal is applied, a first electrode connected to the first node, and a second electrode connected to a first electrode of the 1-2 transistor, and the 1-2 transistor may include a control electrode to which the fifth signal is applied, the first electrode connected to the second electrode of the 1-1 transistor, and a second electrode to which the first low voltage is applied.

In an embodiment, in the variable frequency mode, the fifth signal may have an activation pulse.

In an embodiment, in the variable frequency mode, the fifth signal have an activation pulse when the first low voltage has the activation pulse.

In a display device according to embodiments of the present inventive concept, 29-1 and 29-2 transistors may output a second signal to a first node in response to a first signal, and a ninth transistor may output an N-th sensing gate signal in response to a voltage of the first node. an initialization voltage may be applied to an anode of a light emitting element. Accordingly, an image may be displayed with a uniform luminance at the mutually different driving frequencies.

In a display device according to embodiments of the present inventive concept, 29-1 and 29-2 transistors may output a first signal to a first node in response to the first signal, and a ninth transistor may output an N-th sensing gate signal in response to a voltage of the first node. an initialization voltage may be applied to an anode of a light emitting element. Accordingly, an image may be displayed with a uniform luminance at the mutually different driving frequencies.

In a display device according to embodiments of the present inventive concept, 1-1 and 1-2 transistors may output a first low voltage to a first node in response to a fifth signal, and a ninth transistor may output an N-th sensing gate signal in response to a voltage of the first node. an initialization voltage may be applied to an anode of a light emitting element. Accordingly, an image may be displayed with a uniform luminance at the mutually different driving frequencies.

BRIEF DESCRIPTION OF THE DRAWINGS

The above and other features of embodiments of the inventive concept will become more apparent by describing in detailed embodiments thereof with reference to the accompanying drawings, in which.

DETAILED DESCRIPTION

Hereinafter, embodiments of the present inventive concept will be described in detail with reference to the accompanying drawings.

Figure 1:
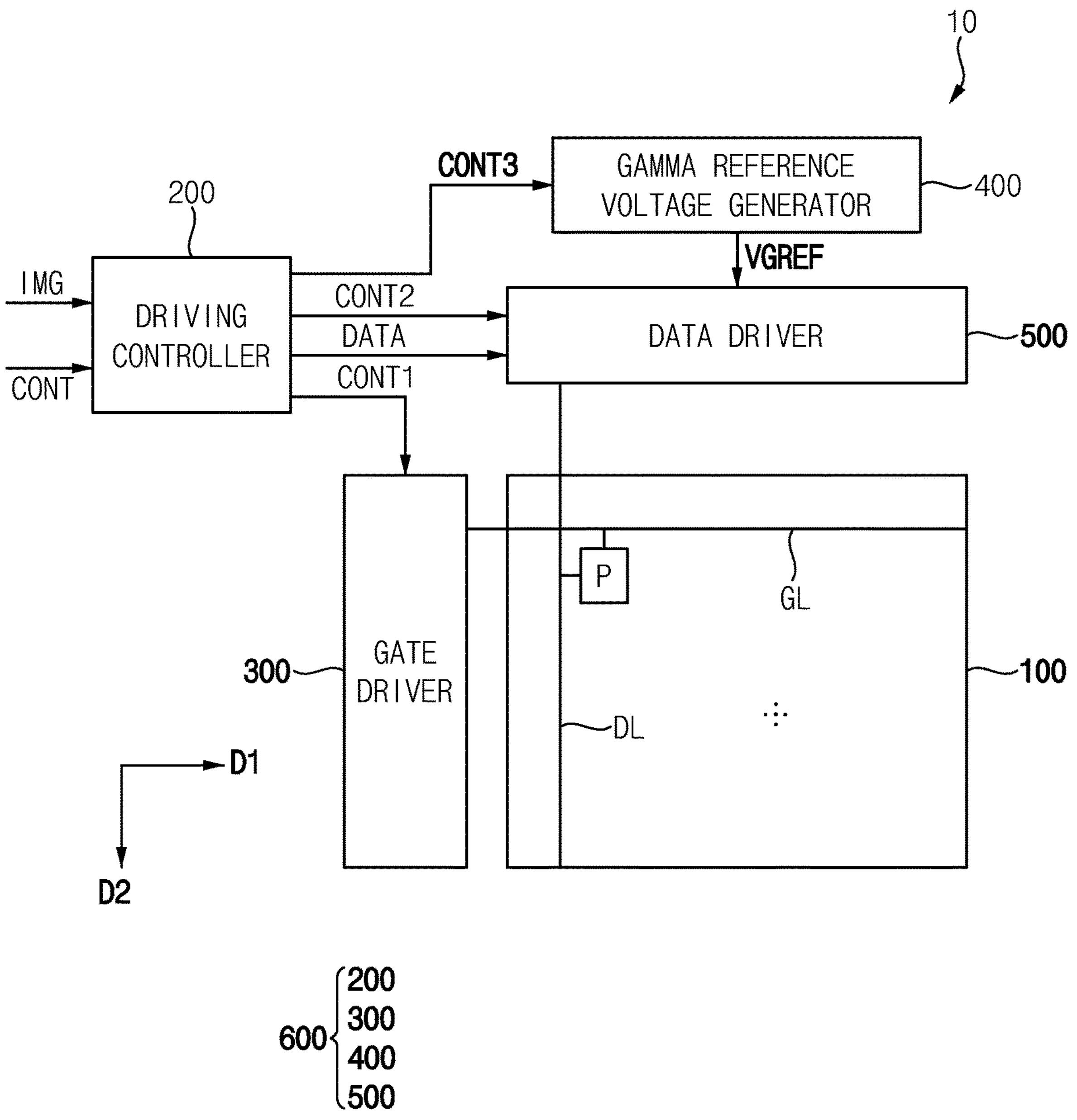
FIG. 1 is a block diagram illustrating a display device according to embodiments.

FIG. 1 is a block diagram illustrating a display device according to embodiments.

Referring to FIG. 1, the display device 10 may include a display panel 100 and a display panel driver 600. The display panel driver 600 may include a driving controller 200, a gate driver 300, a gamma reference voltage generator 400, and a data driver 500.

The driving controller 200 and the data driver 500 may be integrally formed. The driving controller 200, the gamma reference voltage generator 400, and the data driver 500 may be integrally formed. A display panel driver including at least the driving controller 200 and the data driver 500 which are embedded in one chip may be referred to as a timing controller embedded data driver (TED).

The display panel 100 may include a display region displaying an image and a peripheral region disposed adjacent to the display region.

The display panel 100 may be an organic light emitting diode display panel including organic light emitting diodes. The display panel 100 may be a quantum-dot organic light emitting diode display panel including organic light emitting diodes and quantum-dot color filters. The display panel 100 may be a quantum-dot nano light emitting diode display panel including nano light emitting diodes and quantum-dot color filters.

The display panel 100 includes gate lines GL, data lines DL, and pixels P electrically connected to the gate lines GL and the data lines DL. The gate lines GL may extend in a first direction D1 and the data lines DL may extend in a second direction D2 crossing the first direction D1.

The driving controller 200 may receive input image data IMG and an input control signal CONT from an external host processor (e.g., a Graphics Processing Unit (GPU), an application processor, or a graphics card). For example, the input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generates the data signal DATA based on the input image data IMG. The driving controller 200 may output the data signal DATA to the data driver 500. The driving controller 200 may generate the third control signal CONT3 for controlling an operation of the gamma reference voltage generator 400 based on the input control signal CONT, and output the third control signal CONT3 to the gamma reference voltage generator 400.

The gate driver 300 may generate gate signals driving the gate lines GL in response to the first control signal CONT1 received from the driving controller 200. The gate driver 300 may output the gate signals to the gate lines GL. For example, the gate driver 300 may sequentially output the gate signals to the gate lines GL.

In an embodiment, the gate driver 300 may be formed on the peripheral region of the display panel 100 by using the same processes as forming the pixels P.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be embedded in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into analog data voltages using the gamma reference voltage VGREF. The data driver 500 may output the analog data voltages to the data line DL.

Figure 2:
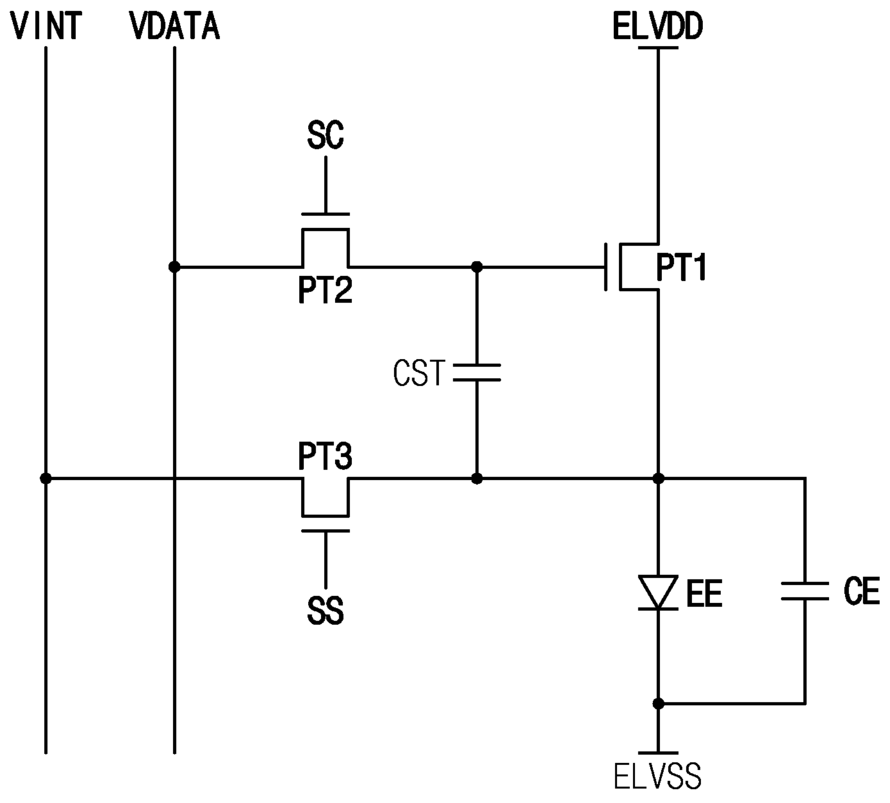
FIG. 2 is a circuit diagram illustrating an example of a pixel of FIG. 1.

FIG. 2 is a circuit diagram illustrating an example of a pixel of FIG. 1.

Referring to FIGS. 1 and 2, the pixel P may include a first pixel switching element PT1, a second pixel switching element PT2, a third pixel switching element PT3, a light emitting element EE, and a storage capacitor CST.

The first pixel switching element PT1 may include a control electrode connected to the storage capacitor CST, a first electrode to which a first power supply voltage ELVDD is applied, and a second electrode connected to the light emitting element EE.

The second pixel switching element PT2 may include a control electrode to which a scan gate signal SC is applied, a first electrode to which a data voltage VDATA is applied, and a second electrode connected to the control electrode of the first pixel switching element PT1.

The third pixel switching element PT3 may include a control electrode to which a sensing gate signal SS is applied, a first electrode to which an initialization voltage VINT is applied, and a second electrode connected to the light emitting element EE.

The light emitting element EE may include an anode connected to the second electrode of the first pixel switching element PT1, and a cathode to which a second power supply voltage ELVSS is applied.

The storage capacitor CST may include a first electrode connected to the control electrode of the first pixel switching element PT1, and a second electrode connected to the second electrode of the first pixel switching element PT1.

The pixel P may further include a light emitting element capacitor CE connected between the anode of the light emitting element EE and the cathode of the light emitting element EE. The light emitting element capacitor CE may refer to an internal capacitance of the light emitting element EE.

When the scan gate signal SC is activated, the second pixel switching element PT2 may be turned on so that the data voltage VDATA may be applied to the control electrode of the first pixel switching element PT1.

When the sensing gate signal SS is activated, the third pixel switching element PT3 may be turned on so that the initialization voltage VINT may be applied to the second electrode of the first pixel switching element PT1.

Since the data voltage VDATA and the initialization voltage VINT are applied to the control electrode and the second electrode of the first pixel switching element PT1, respectively, and the initialization voltage VINT has a constant level, a luminance of the light emitting element EE may be controlled by a level of the data voltage VDATA.

Figure 3:
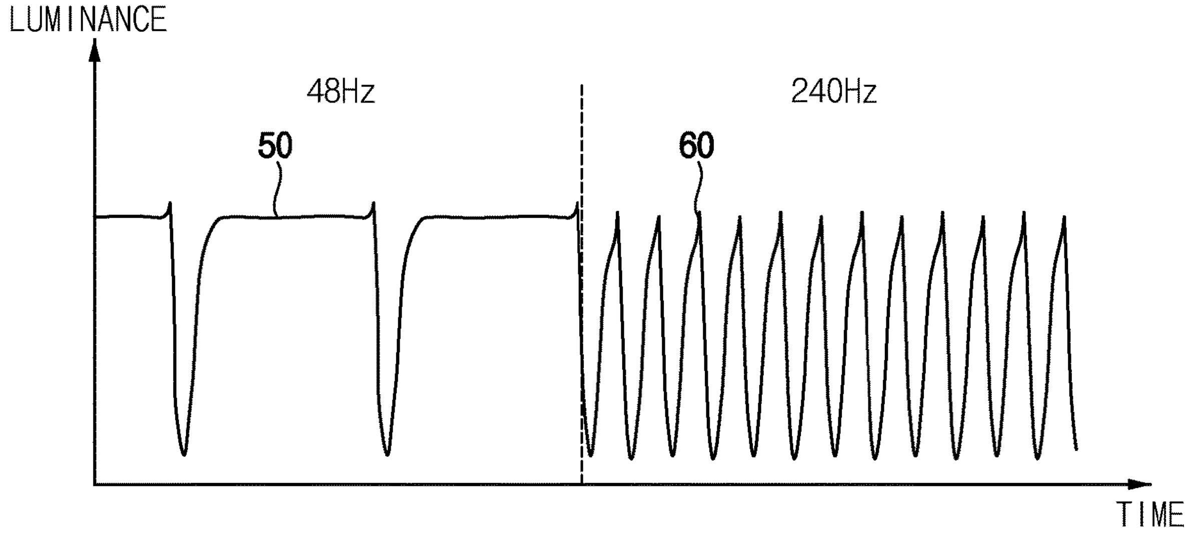
FIG. 3 is a diagram illustrating an example of luminances of a display panel driven at driving frequencies of about 48 Hz and about 240 Hz in a conventional display device.

FIG. 3 is a diagram illustrating an example of luminance of a display panel driven at driving frequencies of about 48 Hz and about 240 Hz in a conventional display device.

Referring to FIGS. 1 to 3, the display device 10 may operate in a normal mode in which the display panel 100 is driven at a fixed driving frequency (e.g., about 240 Hz), and operate in a variable frequency mode in which the display panel 100 is driven at a variable driving frequency.

In the normal mode, the host processor may provide the input image data IMG to the driving controller 200 at a fixed input frame frequency, and a driving frequency of the display panel 100 may be determined as the fixed input frame frequency. In other words, the driving controller 200 may control the data driver 500 and the gate driver 300 to drive the display panel 100 at the fixed input frame frequency that is the fixed driving frequency.

In the variable frequency mode, the host processor may provide the input image data IMG to the driving controller 200 at a variable frame frequency (or a variable frame rate) by changing a length of a blank period in every frame, and the driving frequency of the display panel 100 may also be dynamically changed based on the variable frame frequency. In other words, the driving controller 200 may control the gate driver 300 and the data driver 500 to drive the display panel 100 at the variable driving frequency corresponding to the variable frame frequency. For example, the variable frame frequency or the variable frame rate may be in a range of about 1 Hz to about 240 Hz, but the present disclosure is not limited thereto. In addition, for example, the variable frequency mode may be a free-sync mode or a G-sync mode, but the present disclosure is not limited thereto.

In FIG. 3, LUMINANCE may represent luminance of a display panel 100 in a conventional display device 10 driven at driving frequencies of about 48 Hz and about 240 Hz, and an example of light waveforms of the display panel 100 has been shown. The display panel 100 of the conventional display device 10 may have a large luminance difference between mutually different driving frequencies (or mutually different frame frequencies), and flicker may occur when a driving frequency (or a frame frequency) of the display panel 100 is changed.

The luminance difference between the mutually different driving frequencies may be caused because light waveforms 50 and 60 of the display panel 100 have mutually different numbers of luminance valleys (especially when a low-grayscale image is displayed) at the mutually different driving frequencies. In other words, in the example of FIG.

3, during the same time period, the display panel 100 driven at about 240 Hz may have five frame periods and the display panel 100 driven at about 48 Hz may have one frame period. In addition, the conventional display device 10 may be configured such that each pixel performs an anode initialization operation only once in every frame period, and each of the light waveforms 50 and 60 of the display panel 100 has one luminance valley due to the anode initialization operation (i.e., due to consumption of a driving current generated by the first pixel switching element PT1 to charge the light emitting element capacitor CE discharged by the anode initialization operation) in every frame period. Therefore, during the same time, the display panel 100 driven at about 240 Hz may have five luminance valleys and the display panel 100 driven at about 48 Hz may have one luminance valley so that the luminance of the display panel 100 driven at about 48 Hz may be higher than the luminance of the display panel 100 driven at about 240 Hz (especially when the low-grayscale image is displayed).

In order to reduce the luminance difference between the mutually different driving frequencies according to the embodiments of the present disclosure, the display device 10 may perform an anode initialization operation at a constant period regardless of the driving frequency in the variable frequency mode. In this case, the anode initialization operation may be an operation of applying the initialization voltage VINT to the anode of the light emitting element EE.

Figure 4:
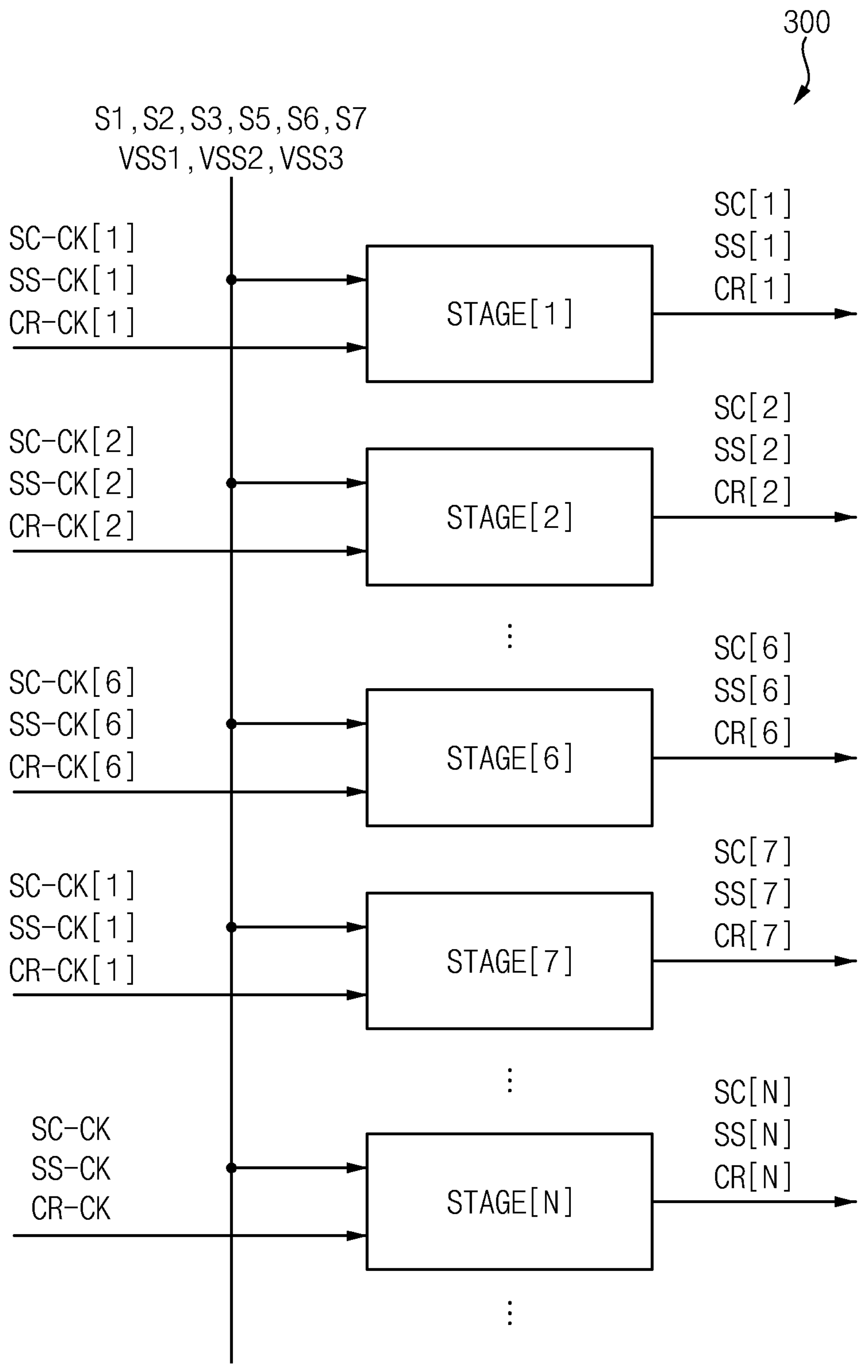
FIG. 4 is a block diagram schematically illustrating some stages of a gate driver of FIG. 1.

FIG. 4 is a block diagram schematically illustrating some stages of a gate driver of FIG. 1.

Referring to FIG. 4, the gate driver 300 may include a plurality of stages STAGE[1], STAGE[2], . . . , STAGE[6], STAGE[7], . . . . The gate signals may include scan gate signals SC[1], SC[2], . . . , SC[6], SC[7], . . . and sensing gate signals SS[1], SS[2], . . . , SS[6], SS[7], . . . . Scan clock signals may include a first scan clock signal SC-CK[1] to a sixth scan clock signal SC-CK[6], and sensing clock signals may include a first sensing clock signal SS-CK[1] to a sixth sensing clock signal SS-CK[6]. In this case, N may be a natural number.

The stages STAGE[1], STAGE[2], . . . , STAGE[6], STAGE[7], . . . may generate the scan gate signals SC[1], SC[2], . . . , SC[6], SC[7], . . . based on scan clock signals SC-CK[1], SC-CK[2], . . . , SC-CK[6], SC-CK[1], . . . . For example, a first stage STAGE[1] may generate a first scan gate signal SC[1] based on a first scan clock signal SC-CK [1]. For example, a second stage STAGE[2] may generate a second scan gate signal SC[2] based on a second scan clock signal SC-CK[2]. For example, a sixth stage STAGE[6] may generate a sixth scan gate signal SC[6] based on a sixth scan clock signal SC-CK[6]. For example, a seventh stage STAGE[7] may generate a seventh scan gate signal SC[7] based on the first scan clock signal SC-CK[1].

The stages STAGE[1], STAGE[2], . . . , STAGE[6], STAGE[7], . . . may generate the sensing gate signals SS[1], SS[2], . . . , SS[6], SS[7], . . . based on sensing clock signals SS-CK[1], SS-CK[2], . . . , SS-CK[6], SS-CK[1], . . . . For example, the first stage STAGE[1] may generate a first sensing gate signal SS[1] based on a first sensing clock signal SS-CK[1]. For example, the second stage STAGE[2] may generate a second sensing gate signal SS[2] based on a second sensing clock signal SS-CK[2]. For example, the sixth stage STAGE[6] may generate a sixth sensing gate signal SS[6] based on a sixth sensing clock signal SS-CK[6]. For example, the seventh stage STAGE[7] may generate a seventh sensing gate signal SS[7] based on the first sensing clock signal SS-CK[1].

The stages STAGE[1], STAGE[2], . . . , STAGE[6], STAGE[7], . . . may generate carry signals CR[1], CR[2], . . . , CR[6], CR[7], . . . based on carry clock signals CR-CK[1], CR-CK[2], . . . , CR-CK[6], CR-CK[1], . . . . For example, the first stage STAGE[1] may generate a first carry signal CR[1] based on a first carry clock signal CR-CK[1]. For example, the second stage STAGE[2] may generate a second carry signal CR[2] based on a second carry clock signal CR-CK[2]. For example, the sixth stage STAGE[6] may generate a sixth carry signal CR[6] based on a sixth carry clock signal CR-CK[6]. For example, the seventh stage STAGE[7] may generate a seventh carry signal CR[7] based on the first carry clock signal CR-CK[1].

The stages STAGE[1], STAGE[2], . . . , STAGE[N], . . . may generate the scan gate signals SC[1], SC[2], . . . , SC[6], SC[7], . . . , the sensing gate signals SS[1], SS[2], . . . , SS[6], SS[7], . . . , and the carry signals CR[1], CR[2], . . . , CR[6], CR[7], . . . based on a first signal S1, a second signal S2, a third signal S3, a fifth signal S5, a sixth signal S6, a seventh signal S7, a first low voltage VSS1, a second low voltage VSS2, and a third low voltage VSS3.

Figure 5:
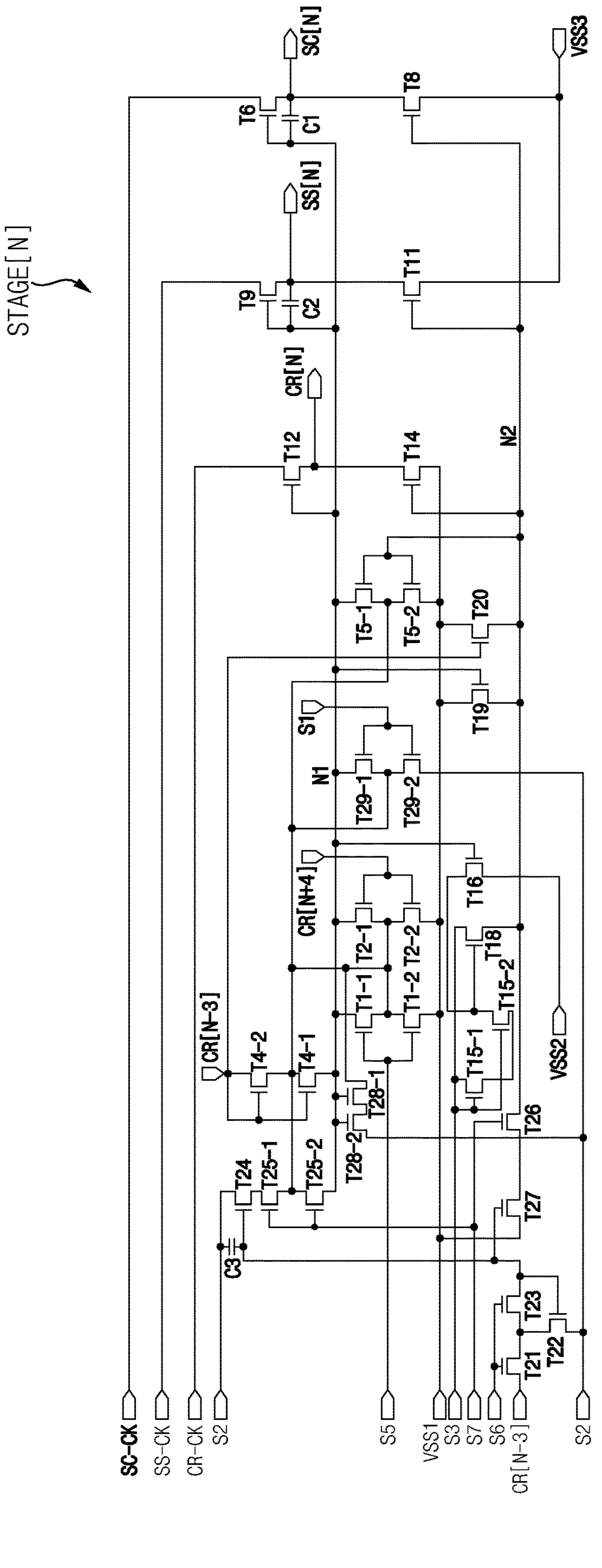
FIG. 5 is a circuit diagram illustrating an example of a gate driving circuit of an N-th stage of FIG. 4.
Figure 6:
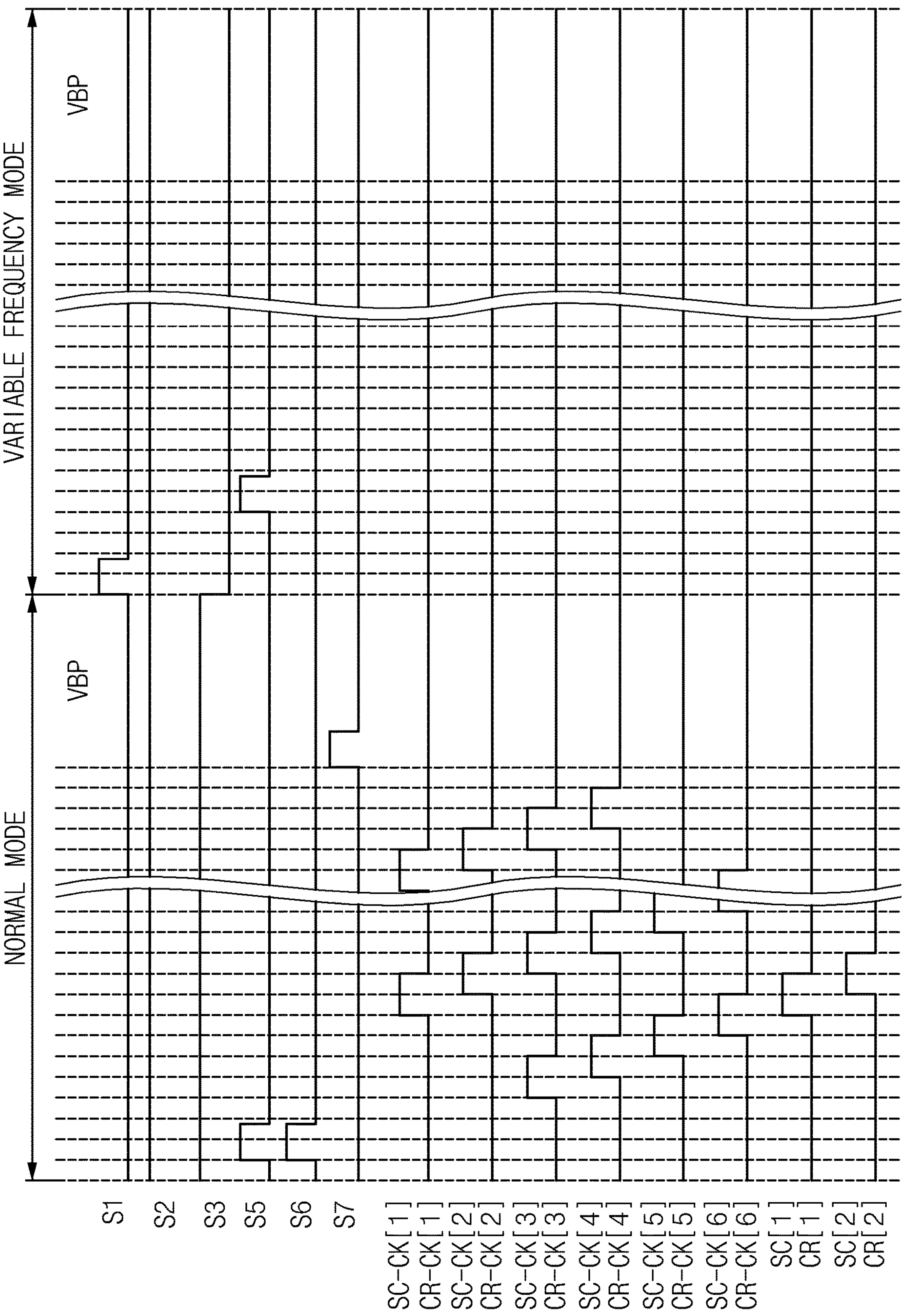
FIG. 6 is a timing diagram illustrating input signals, scan gate signals, and carry signals of the gate driving circuit of FIG. 5.
Figure 7:
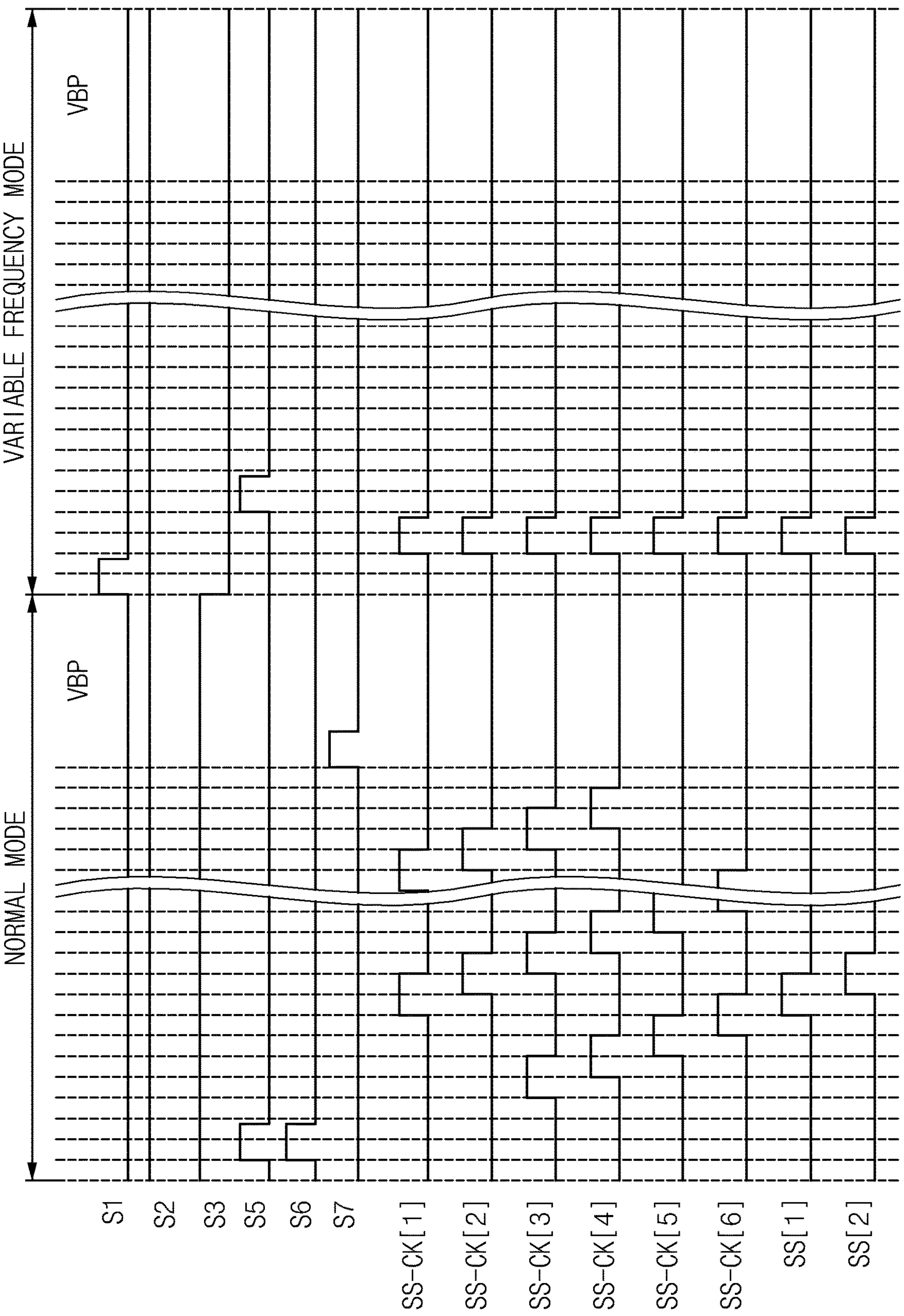
FIG. 7 is a timing diagram illustrating the input signals and sensing gate signals of the gate driving circuit of FIG. 5.

FIG. 5 is a circuit diagram illustrating an example of a gate driving circuit of an N-th stage of FIG. 4. FIG. 6 is a timing diagram illustrating input signals, scan gate signals, and carry signals of the gate driving circuit of FIG. 5. FIG. 7 is a timing diagram illustrating the input signals and sensing gate signals of the gate driving circuit of FIG. 5.

Referring to FIGS. 1 to 7, the gate driver 300 may include a plurality of stages STAGE[1], STAGE[2], . . . , STAGE[3], STAGE[7], . . . , and each of the stages STAGE[1], STAGE [2], . . . , STAGE[3], STAGE[7], . . . may include a gate driving circuit. For example, the first stage STAGE[1] may output the gate signals SC[1] and SS[1] corresponding to a first gate line which may be applied to gate lines GL of a first pixel row. For example, the second stage STAGE[2] may output the gate signals SC[2] and SS[2] corresponding to a second gate line which may be applied to gate lines GL of a second pixel row. For example, the sixth stage STAGE[6] may output the gate signals SC[6] and SS[6] corresponding to a sixth gate line which may be applied to gate lines GL of a sixth pixel row. For example, the seventh stage STAGE [7] may output the gate signals SC[7] and SS[7] corresponding to a seventh gate line which may be applied to gate lines GL of a seventh pixel row.

The gate driving circuit may include an N-th stage STAGE[N] outputting an N-th scan gate signal SC[N] based on a scan clock signal SC-CK, a voltage of a first node N1, and a voltage of a second node N2, outputting an N-th sensing gate signal SS[N] based on a sensing clock signal SS-CK, the voltage of the first node N1, and the voltage of the second node N2, and outputting an N-th carry signal CR[N] based on a carry clock signal CR-CK, the voltage of the first node N1, and the voltage of the second node N2. In this case, N may be a natural number.

The N-th stage STAGE[N] may include an inverter. The inverter may control the second node N2 based on the third signal S3. As shown in FIGS. 6 and 7, the third signal S3 may be a direct-current signal having a high level in the normal mode.

The inverter may include a 15-1 transistor T15-1, a 15-2 transistor T15-2, and an eighteenth transistor T18.

The 15-1 transistor T15-1 may include a control electrode to which the third signal S3 is applied, a first electrode to which the third signal S3 is applied, and a second electrode connected to a second electrode of the 15-2 transistor T15-2.

The 15-2 transistor T15-2 may include a control electrode to which the third signal S3 is applied, a first electrode connected to a control electrode of the eighteenth transistor T18, and the second electrode connected to the second electrode of the 15-1 transistor T15-1.

The eighteenth transistor T18 may include the control electrode connected to the first electrode of the 15-2 transistor T15-2, a first electrode to which the third signal S3 is applied, and a second electrode connected to the second node N2.

The inverter may further include a sixteenth transistor T16.

The sixteenth transistor T16 may apply the second low voltage VSS2 to the control electrode of the eighteenth transistor T18 according to a voltage of the first node N1.

The sixteenth transistor T16 may include a control electrode connected to the first node N1, a first electrode to which the second low voltage VSS2 is applied, and a second electrode connected to the control electrode of the eighteenth transistor T18.

In addition, the N-th stage STAGE[N] may include a first sensor. The first sensor may include a twenty-first transistor T21, a twenty-second transistor T22, and a twenty-third transistor T23.

The twenty-first transistor T21 may include a control electrode to which the sixth signal S6 is applied, a first electrode to which a previous carry signal (e.g., CR[N−3]) which is one of carry signals of previous stages is applied, and a second electrode connected to a second electrode of the twenty-second transistor T22. As shown in FIGS. 6 and 7, the sixth signal S6 may have one activation pulse within an activation period in the normal mode and a sensing target gate line may be selected by the sixth signal S6.

In an embodiment, CR[N−3] which is a carry signal of a previous stage that is three stages before the N-th stage STAGE[N] has been illustrated as the previous carry signal, but the present disclosure is not limited thereto.

The twenty-third transistor T23 may include a control electrode to which the sixth signal S6 is applied, a first electrode connected to the second electrode of the twenty-first transistor T21, and a second electrode connected to a control electrode of the twenty-second transistor T22.

The twenty-second transistor T22 may include the control electrode connected to the second electrode of the twenty-third transistor T23, a first electrode to which the second signal S2 is applied, and the second electrode connected to the second electrode of the twenty-first transistor T21. As shown in FIGS. 6 and 7, the second signal S2 may be a direct-current signal having a high level.

The first sensor may further include a twenty-sixth transistor T26 and a twenty-seventh transistor T27.

The twenty-sixth transistor T26 may include a control electrode to which the seventh signal S7 is applied, a first electrode connected to a second electrode of the twenty-seventh transistor T27, and a second electrode connected to the second node N2. As shown in FIGS. 6 and 7, the seventh signal S7 may have an activation pulse at the beginning of a blank period in the normal mode. When the seventh signal S7 has a high level, the gate signal may be applied to the sensing target gate line selected by the sixth signal S6.

The twenty-seventh transistor T27 may include a control electrode connected to the second electrode of the twenty-third transistor T23, a first electrode to which the first low voltage VSS1 is applied, and the second electrode connected to the first electrode of the twenty-sixth transistor T26.

The N-th stage STAGE[N] may include a second sensor. The second sensor may include a twenty-fourth transistor T24, a 25-1 transistor T25-1, a 25-2 transistor T25-2, and a third capacitor C3.

The twenty-fourth transistor T24 may include a control electrode connected to the second electrode of the twenty-third transistor T23, a first electrode to which the second signal S2 is applied, and a second electrode connected to a first electrode of the 25-1 transistor T25-1.

The 25-1 transistor T25-1 may include a control electrode to which the seventh signal S7 is applied, the first electrode connected to the second electrode of the twenty-fourth transistor T24, and a second electrode connected to a first electrode of the 25-2 transistor T25-2.

The 25-2 transistor T25-2 may include a control electrode to which the seventh signal S7 is applied, the first electrode connected to the second electrode of the 25-1 transistor T25-1, and a second electrode connected to the first node N1.

The third capacitor C3 may include a first electrode to which the second signal S2 is applied and a second electrode connected to the control electrode of the twenty-fourth transistor T24.

The third capacitor C3 may serve to store a high-level voltage when a corresponding stage is selected as a sensing target by the sixth signal S6.

The N-th stage STAGE[N] may include a first pull-up controller. The first pull-up controller may output the previous carry signal CR[N−3] to the first node N1 in response to the previous carry signal CR[N−3].

For example, the first pull-up controller may include a 4-1 transistor T4-1 and a 4-2 transistor T4-2.

The 4-2 transistor T4-2 may include a control electrode to which the previous carry signal CR[N−3] is applied, a first electrode to which the previous carry signal CR[N−3] is applied, and a second electrode connected to a first electrode of the 4-1 transistor T4-1.

The 4-1 transistor T4-1 may include a control electrode to which the previous carry signal CR[N−3] is applied, the first electrode connected to the second electrode of the 4-2 transistor T4-2, and a second electrode connected to the first node N1.

The N-th stage STAGE[N] may further include a second pull-up controller. The second pull-up controller may output the first low voltage VSS1 to the first node N1 in response to a next carry signal (e.g., CR[N+4]) which is one of carry signals of next stages.

In the present embodiment, CR[N+4] which is a carry signal of a next stage that is four stages after the N-th stage (STAGE[N]) has been illustrated as the next carry signal, but the present disclosure is not limited thereto.

For example, the second pull-up controller may include a 2-1 transistor T2-1 and a 2-2 transistor T2-2. Although a case in which the second pull-up controller includes two transistors T2-1 and T2-2 connected in series to prevent leakage has been illustrated according to the present embodiment, the present disclosure is not limited thereto, and the second pull-up controller may include one transistor, or at least three transistors connected in series.

The 2-1 transistor T2-1 may include a control electrode to which the next carry signal CR[N+4] is applied, a first electrode connected to a second electrode of the 2-2 transistor T2-2, and a second electrode connected to the first node N1.

The 2-2 transistor T2-2 may include a control electrode to which the next carry signal CR[N+4] is applied, a first electrode to which the first low voltage VSS1 is applied, and the second electrode connected to the first electrode of the 2-1 transistor T2-1.

The N-th stage STAGE[N] may further include a third pull-up controller. The third pull-up controller may output the first low voltage VSS1 to the first node N1 in response to the voltage of the second node N2.

For example, the third pull-up controller may include a 5-1 transistor T5-1 and a 5-2 transistor T5-2. Although a case in which the third pull-up controller includes two transistors T5-1 and T5-2 connected in series to prevent leakage has been illustrated according to the present embodiment, the present disclosure is not limited thereto, and the third pull-up controller may include one transistor, or at least three transistors connected in series.

The 5-1 transistor T5-1 may include a control electrode connected to the second node N2, a first electrode connected to a second electrode of the 5-2 transistor T5-2, and a second electrode connected to the first node N1.

The 5-2 transistor T5-2 may include a control electrode connected to the second node N2, a first electrode to which the first low voltage VSS1 is applied, and the second electrode connected to the first electrode of the 5-1 transistor T5-1.

The N-th stage STAGE[N] may include a first pull-down controller. The first pull-down controller may output the first low voltage VSS1 to the second node N2 in response to the voltage of the first node N1.

For example, the first pull-down controller may include a nineteenth transistor T19. The nineteenth transistor T19 may include a control electrode connected to the first node N1, a first electrode to which the first low voltage VSS1 is applied, and a second electrode connected to the second node N2.

The N-th stage STAGE[N] may further include a second pull-down controller. The second pull-down controller may output the first low voltage VSS1 to the second node N2 in response to the previous carry signal CR[N−3].

For example, the second pull-down controller may include a twentieth transistor T20. The twentieth transistor T20 may include a control electrode to which the previous carry signal CR[N−3] is applied, a first electrode to which the first low voltage VSS1 is applied, and a second electrode connected to the second node N2.

The N-th stage STAGE[N] may include a scan gate output circuit. The scan gate output circuit may include a sixth transistor T6 applying the scan clock signal SC-CK to a scan gate output node in response to the first node N1, an eighth transistor T8 applying the third low voltage VSS3 to the scan gate output node in response to the second node N2, and a first capacitor C1 connected between a control electrode of the sixth transistor T6 and the scan gate output node. The first capacitor C1 may boost the first node N1 when the scan clock signal SC-CK has a high level.

The N-th stage STAGE[N] may further include a sensing gate output circuit. The sensing gate output circuit may include a ninth transistor T9 applying the sensing clock signal SS-CK to a sensing gate output node according to a voltage of the first node N1, an eleventh transistor T11 applying the third low voltage VSS3 to the sensing gate output node according to a voltage of the second node N2, and a second capacitor C2 connected between a control electrode of the ninth transistor T9 and the sensing gate output node. The second capacitor C2 may boost the first node N1 when the sensing clock signal SS-CK has a high level.

The N-th stage STAGE[N] may further include a carry output circuit. The carry output circuit may include a twelfth transistor T12 applying the carry clock signal CR-CK to a carry output node according to a voltage of the first node N1, and a fourteenth transistor T14 applying the first low voltage VSS1 to the carry output node according to a voltage of the second node N2.

The N-th stage STAGE[N] may further include a resetter. The resetter may output the first low voltage VSS1 to the first node N1 in response to the fifth signal S5. As shown in FIGS. 6 and 7, the fifth signal S5 may be a signal having an activation pulse at the beginning of the activation period in the normal mode. In other words, when the fifth signal S5 has a high level at the beginning of the activation period in the normal mode, the first node N1 may be reset to the first low voltage VSS1 by the resetter.

For example, the resetter may include a 1-1 transistor T1-1 and a 1-2 transistor T1-2. Although a case in which the resetter includes two transistors T1-1 and T1-2 connected in series to prevent leakage has been illustrated according to the present embodiment, the present disclosure is not limited thereto, and the resetter may include one transistor, or at least three transistors connected in series.

The N-th stage STAGE[N] may further include a stabilizer. The stabilizer may apply a high voltage (e.g., the second signal S2) to an intermediate node of two transistors configured in series to prevent leakage, thereby improving leakage prevention efficiency of the two transistors configured in series.

The stabilizer may include a 28-1 transistor T28-1 and a 28-2 transistor T28-2. Although a case in which the stabilizer also includes two transistors T28-1 and T28-2 connected in series to prevent leakage has been illustrated according to the present embodiment, the present disclosure is not limited thereto, and the stabilizer may include one transistor, or at least three transistors connected in series.

For example, an output electrode of the stabilizer may be connected to an intermediate node of the 1-1 transistor T1-1 and the 1-2 transistor T1-2, an intermediate node of the 2-1 transistor T2-1 and the 2-2 transistor T2-2, an intermediate node of the 4-1 transistor T4-1 and the 4-2 transistor T4-2, an intermediate node of the 5-1 transistor T5-1 and the 5-2 transistor T5-2, an intermediate node of the 25-1 transistor T25-1 and the 25-2 transistor T25-2, and an intermediate node of a 29-1 transistor T29-1 and a 29-2 transistor T29-2.

The N-th stage STAGE[N] may further include a compensator. The compensator may output the second signal S2 to the first node N1 in response to the first signal S1.

For example, the compensator may include a 29-1 transistor T29-1 and a 29-2 transistor T29-2.

The 29-1 transistor T29-1 may include a control electrode to which the first signal S1 is applied, a first electrode connected to a second electrode of the 29-2 transistor T29-2, and a second electrode connected to the first node N1.

The 29-2 transistor T29-2 may include a control electrode to which the first signal S1 is applied, a first electrode to which the second signal S2 is applied, and the second electrode connected to the first electrode of the 29-1 transistor T29-1.

The compensator may output the second signal S2 to the first node N1 in response to the first signal S1. As shown in FIGS. 6 and 7, the second signal S2 may be a direct-current signal having a high level, and the first signal S1 may be a signal having an activation pulse at the beginning of the variable frequency mode. In other words, when the 29-1 transistor T29-1 and the 29-2 transistor T29-2 are turned on in response to the first signal S1 having an activation pulse at the beginning of the variable frequency mode, the second signal S2 may be applied to the first node N1, and the voltage of the first node N1 may have a high level.

During a period where the voltage of the first node N1 has the high level, a pulse of the N-th scan gate signal SC[N] may be output by the scan clock signal SC-CK of the N-th stage STAGE[N], a pulse of the N-th sensing gate signal SS[N] may be output by the sensing clock signal SS-CK of the N-th stage STAGE[N], and a pulse of the N-th carry signal CR[N] may be output by the carry clock signal CR-CK of the N-th stage STAGE[N].

The gate driver 300 may be configured such that the sensing clock signals SS-CK[1], SS-CK[2], . . . , SS-CK[6], SS-CK[1], . . . are simultaneously applied to the stages STAGE[1], STAGE[2], . . . , STAGE[6], STAGE[7], . . . after the activation pulse of the first signal S1. Therefore, the gate driver 300 may simultaneously apply the sensing gate signals SS[1], SS[2], . . . , SS[6], SS[7], . . . to pixel rows in response to the sensing clock signals SS-CK[1], SS-CK[2], . . . , SS-CK[6], SS-CK[1], . . . .

The gate driver 300 may be configured such that each of the scan clock signals SC-CK[1], SC-CK[2], . . . , SC-CK[6], SC-CK[1], . . . and the carry clock signals CR-CK[1], CR-CK[2], . . . , CR-CK[6], CR-CK[1], . . . has a low level in the variable frequency mode. Therefore, the scan gate signals SC[1], SC[2], . . . , SC[6], SC[7], . . . and the carry signals CR[1], CR[2], . . . , CR[6], CR[7], . . . may not be output.

The fifth signal S5 may be a signal having an activation pulse after the sensing gate signals SS[1], SS[2], . . . , SS[6], SS[7], . . . are simultaneously applied to the pixel rows in the variable frequency mode. The resetter may output the first low voltage VSS1 to the first node N1 in response to the fifth signal S5. When the fifth signal S5 has a high level, the first node N1 may be reset to the first low voltage VSS1 by the resetter.

In the variable frequency mode, the gate driver 300 may not apply the scan gate signal SC to the control electrode of the second pixel switching element PT2 when the sensing gate signal SS is applied to the control electrode of the first pixel switching element PT1.

In other words, as disclosed in FIG. 2, the sensing gate signal SS may be activated to turn on the third pixel switching element PT3, and the anode initialization operation of applying the initialization voltage VINT to the anode of the light emitting element EE may be performed. The light emitting element capacitor CE may be initialized or discharged by the anode initialization operation.

In order to reduce the luminance difference between the mutually different driving frequencies, according to the embodiments of the present disclosure, the display device 10 may be configured such that each of the pixels performs the anode initialization operation at a same frequency (e.g., at a maximum frequency of the variable frame frequency) regardless of the driving frequency. For example, the gate driver 300 may perform the anode initialization operation every shortest frame period among frame periods.

When the anode initialization operation is performed at the same frequency regardless of the driving frequency, light waveforms of the display panel 100 driven at the mutually different driving frequencies may have the same number of luminance valleys. Accordingly, an image may be displayed with a uniform luminance at the mutually different driving frequencies.

Figure 8:
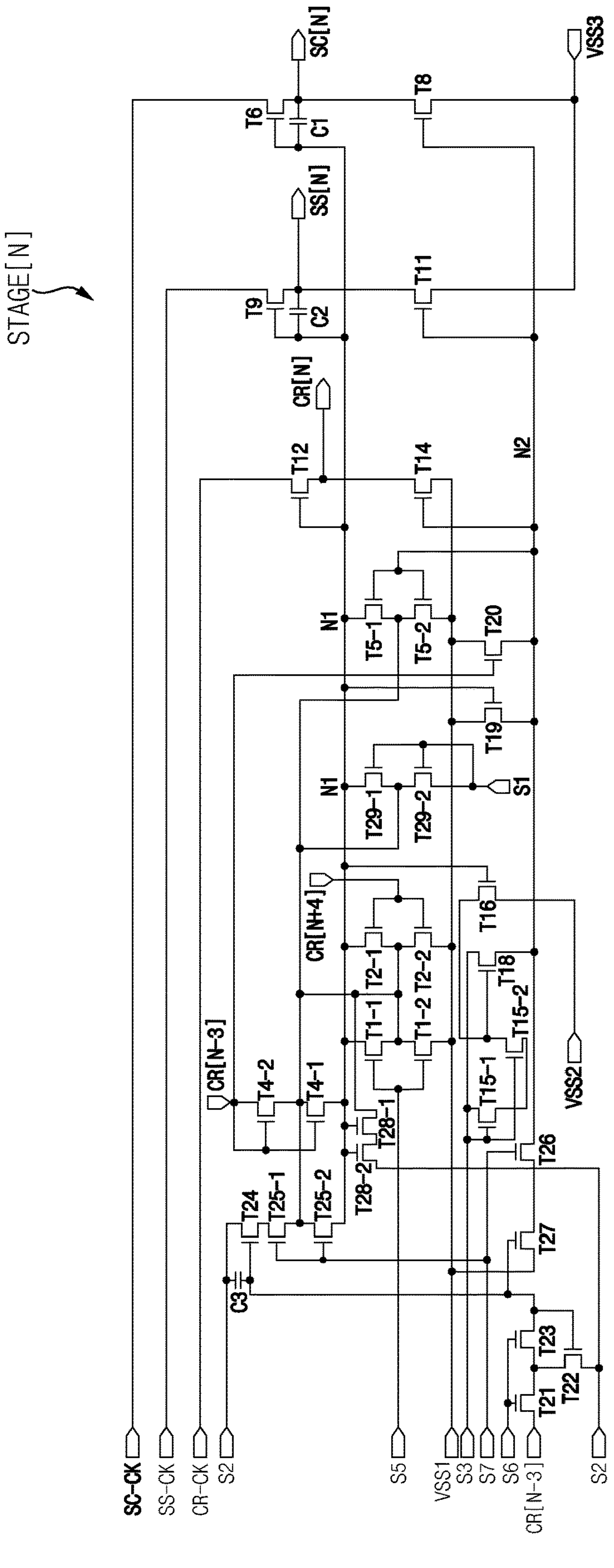
FIGS. 8, 9 and 10 are circuit diagrams illustrating other examples of a gate driving circuit of an N-th stage of FIG. 4.
Figure 9:
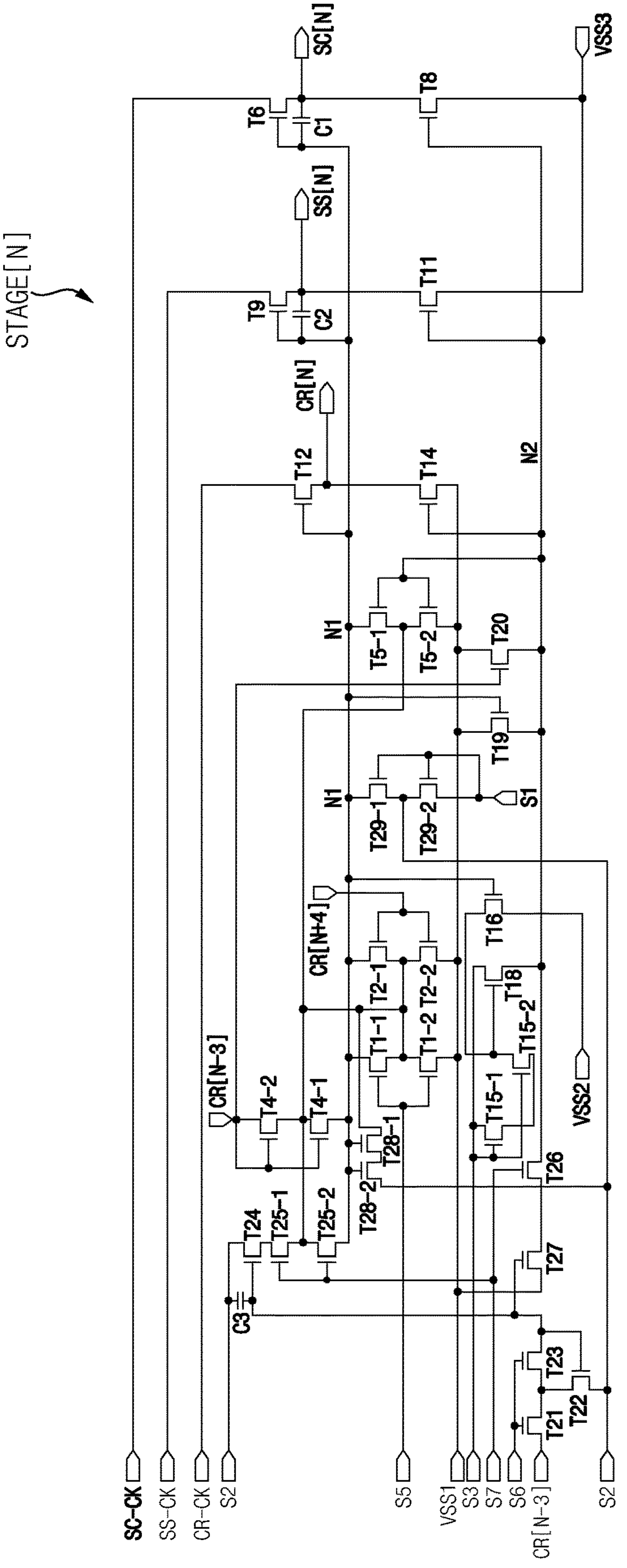
Figure 10:
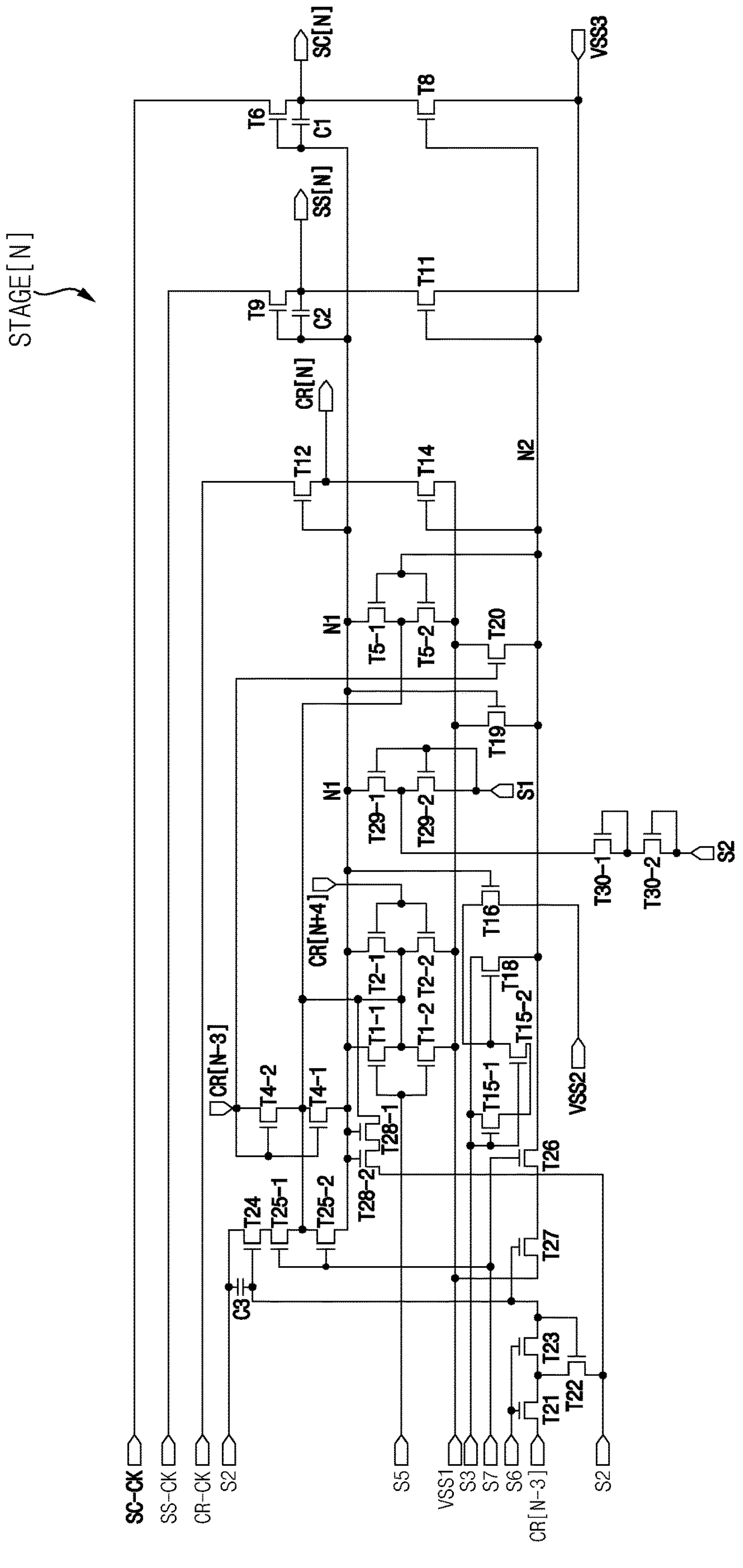
Figure 11:
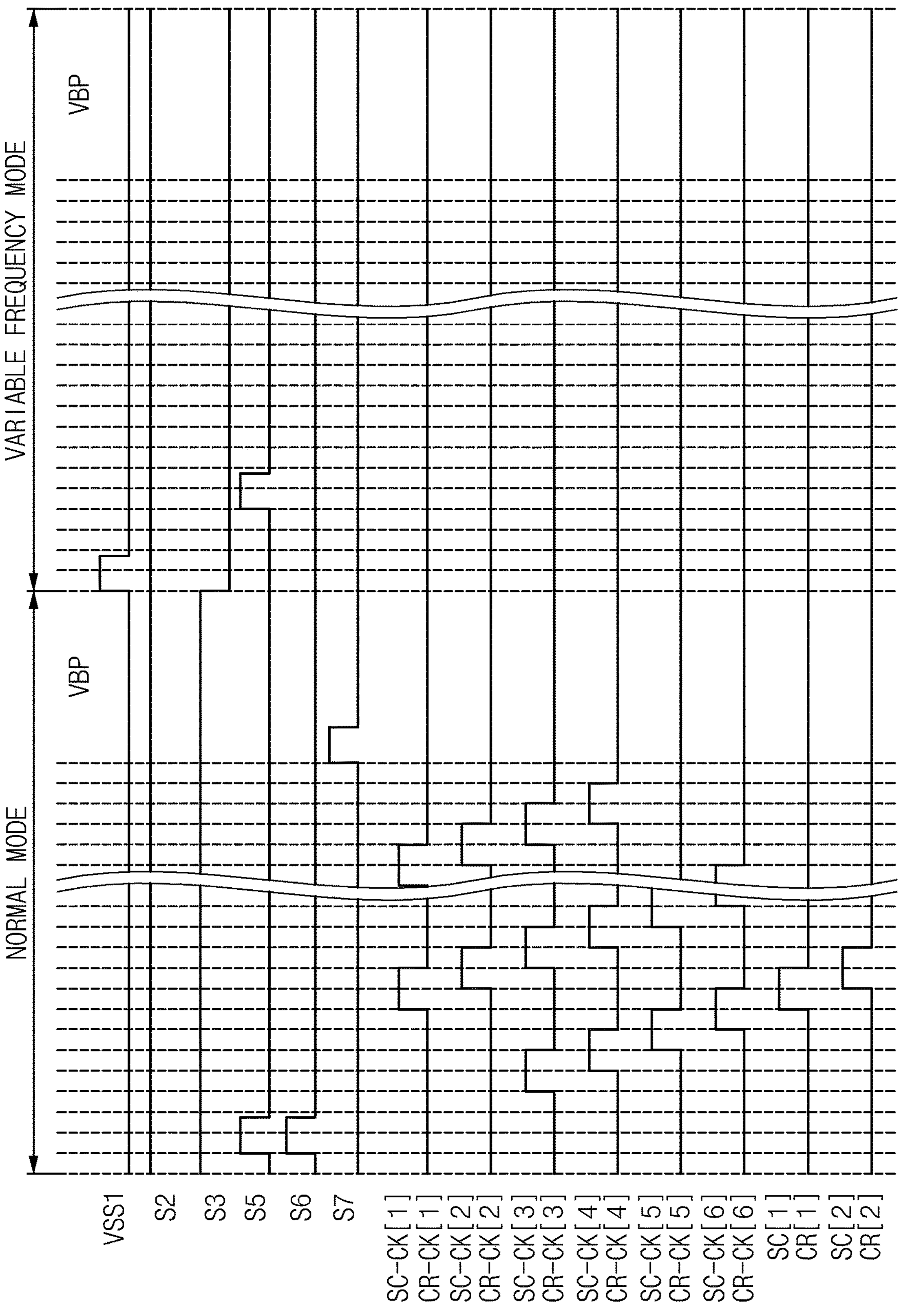
FIG. 11 is a timing diagram illustrating input signals, scan gate signals, and carry signals of the gate driving circuits of FIGS. 8 to 10.
Figure 12:
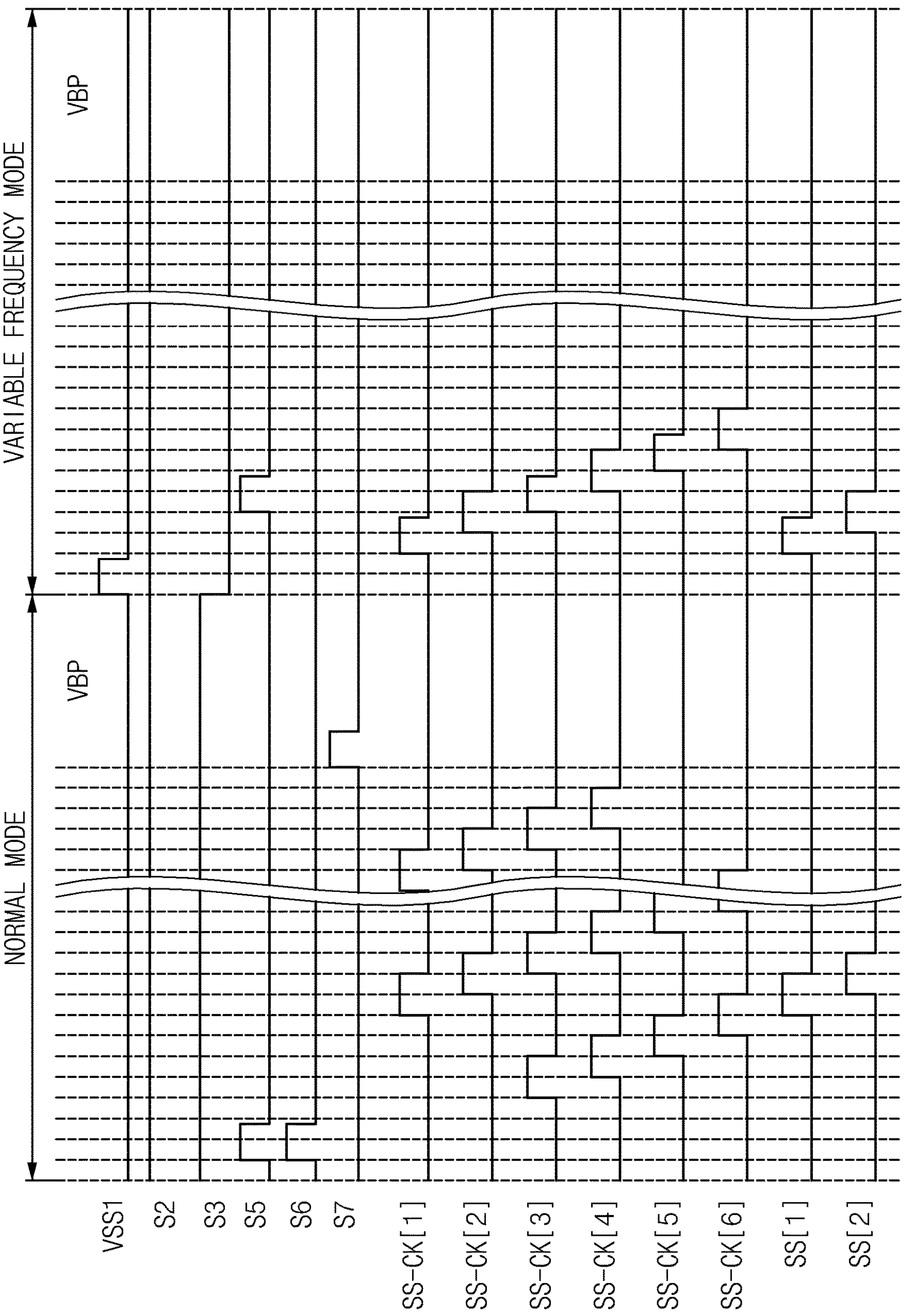
FIG. 12 is a timing diagram illustrating the input signals and sensing gate signals of the gate driving circuits of FIGS. 8 to 10.

FIGS. 8 to 10 are circuit diagrams illustrating other examples of a gate driving circuit of an N-th stage of FIG. 4. FIG. 11 is a timing diagram illustrating input signals, scan gate signals, and carry signals of the gate driving circuits of FIGS. 8 to 10. FIG. 12 is a timing diagram illustrating the input signals and sensing gate signals of the gate driving circuits of FIGS. 8 to 10.

Referring to FIGS. 1 to 8, a gate driving circuit of FIG. 8 may be substantially the same as the gate driving circuit of the N-th stage STAGE[N] of FIG. 4 except that the first electrode of the 29-2 transistor T29-2 receives the first signal S1 unlike the gate driving circuit of the N-th stage STAGE[N] of FIG. 5.

Referring to FIGS. 1 to 7 and 9, a gate driving circuit of FIG. 9 may be substantially the same as the gate driving circuit of the N-th stage STAGE[N] of FIG. 5 except that the first electrode of the 29-2 transistor T29-2 receives the first signal S1, and the second signal S2 is directly applied to the intermediate node of the 29-1 transistor T29-1 and the 29-2 transistor T29-2 unlike the gate driving circuit of the N-th stage STAGE[N] of FIG. 5.

Referring to FIGS. 1 to 7 and 10, a gate driving circuit of FIG. 10 may be substantially the same as the gate driving circuit of the N-th stage STAGE[N] of FIG. 5 except that the first electrode of the 29-2 transistor T29-2 receives the first signal S1, and the gate driving circuit of FIG. 10 further includes a 30-1 transistor T30-1 and a 30-2 transistor T30-2 connected to the intermediate node of the 29-1 transistor T29-1 and the 29-2 transistor T29-2 unlike the gate driving circuit of the N-th stage STAGE[N] of FIG. 5.

Therefore, redundant descriptions of the same or corresponding components in the gate driving circuits of FIGS. 8 to 10 will be omitted.

Referring to FIGS. 1 to 12, each of the gate driving circuits of FIGS. 8 to 10 may include an N-th stage STAGE[N] outputting an N-th scan gate signal SC[N] based on a scan clock signal SC-CK, a voltage of a first node N1, and a voltage of a second node N2, output an N-th sensing gate signal SS[N] based on a sensing clock signal SS-CK, the voltage of the first node N1, and the voltage of the second node N2, and output an N-th carry signal CR[N] based on a carry clock signal CR-CK, the voltage of the first node N1, and the voltage of the second node N2. In this case, N may be a natural number.

Each of the compensators of FIGS. 8 to 10 may include a 29-1 transistor T29-1 and a 29-2 transistor T29-2. The 29-1 transistor T29-1 may include a control electrode to which the first signal S1 is applied, a first electrode connected to a second electrode of the 29-2 transistor T29-2, and a second electrode connected to the first node N1. The 29-2 transistor T29-2 may include a control electrode to which the first signal S1 is applied, a first electrode to which the first signal S1 is applied, and the second electrode connected to the first electrode of the 29-1 transistor T29-1.

However, the intermediate node of the 29-1 transistor T29-1 and the 29-2 transistor T29-2 of FIG. 8 may be connected to the output electrode of the stabilizer.

The second signal S2 may be directly applied to the intermediate node of the 29-1 transistor T29-1 and the 29-2 transistor T29-2 of FIG. 9.

The compensator of FIG. 10 may further include a 30-1 transistor T30-1 and a 30-2 transistor T30-2 as compared with the compensator of FIG. 9. The 30-1 transistor T30-1 may include a control electrode connected to a second electrode of the 30-2 transistor T30-2, a first electrode connected to the second electrode of the 30-2 transistor T30-2, and a second electrode connected to the intermediate node of the 29-1 transistor T29-1 and the 29-2 transistor T29-2. The 30-2 transistor T30-2 may include a control electrode to which the second signal S2 is applied, a first electrode to which the second signal S2 is applied, and the second electrode connected to the first electrode of the 30-1 transistor T30-1.

In the variable frequency mode, the first low voltage VSS1 may have an activation pulse, and the sixth transistor T6 may not output the N-th scan gate signal SC[N] when the ninth transistor T9 outputs the N-th sensing gate signal SS[N] based on the sensing clock signal SS-CK, the voltage of the first node N1, and the voltage of the second node N2.

During a period where the voltage of the first node N1 has the high level, a pulse of the N-th scan gate signal SC[N] may be output by the scan clock signal SC-CK of the N-th stage STAGE[N], a pulse of the N-th sensing gate signal SS[N] may be output by the sensing clock signal SS-CK of the N-th stage STAGE[N], and a pulse of the N-th carry signal CR[N] may be output by the carry clock signal CR-CK of the N-th stage STAGE[N].

The gate driver 300 may be configured such that the sensing clock signals SS-CK[1], SS-CK[2], . . . , SS-CK[6], SS-CK[1], . . . are sequentially applied to the stages STAGE[1], STAGE[2], . . . , STAGE[6], STAGE[7], . . . after the activation pulse of the first low voltage VSS1. Therefore, the gate driver 300 may sequentially apply the sensing gate signals SS[1], SS[2], . . . , SS[6], SS[7], . . . to pixel rows in response to the sensing clock signals SS-CK[1], SS-CK[2], . . . , SS-CK[6], SS-CK[1], . . . .

The gate driver 300 may be configured such that each of the scan clock signals SC-CK[1], SC-CK[2], . . . , SC-CK[6], SC-CK[1], . . . and the carry clock signals CR-CK[1], CR-CK[2], . . . , CR-CK[6], CR-CK[1], . . . has a low level in the variable frequency mode. Therefore, the scan gate signals SC[1], SC[2], . . . , SC[6], SC[7], . . . and the carry signals CR[1], CR[2], . . . , CR[6], CR[7], . . . may not be output.

In the variable frequency mode, the gate driver 300 may not apply the scan gate signal SC to the control electrode of the second pixel switching element PT2 when the sensing gate signal SS is applied to the control electrode of the first pixel switching element PT1.

In other words, as disclosed in FIG. 2, the sensing gate signal SS may be activated to turn on the third pixel switching element PT3, and the anode initialization operation of applying the initialization voltage VINT to the anode of the light emitting element EE may be performed.

The light emitting element capacitor CE may be initialized or discharged by the anode initialization operation.

In order to reduce the luminance difference between the mutually different driving frequencies, according to the embodiments of the present disclosure, the display device 10 may be configured such that each of the pixels performs the anode initialization operation at a same frequency (e.g., at a maximum frequency of the variable frame frequency) regardless of the driving frequency. For example, the gate driver 300 may perform the anode initialization operation every shortest frame period among frame periods.

When the anode initialization operation is performed at the same frequency regardless of the driving frequency, light waveforms of the display panel 100 driven at the mutually different driving frequencies may have the same number of luminance valleys. Accordingly, an image may be displayed with a uniform luminance at the mutually different driving frequencies.

Figure 13:
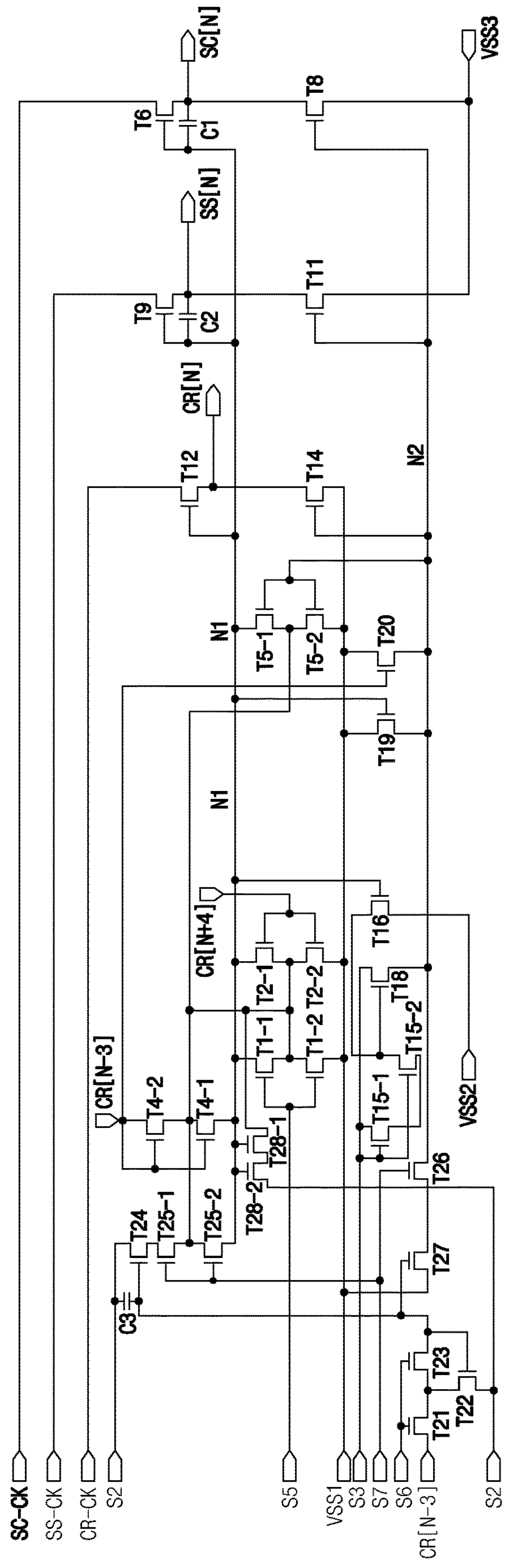
FIG. 13 is a circuit diagram illustrating another example of a gate driving circuit of an N-th stage of FIG. 4.
Figure 14:
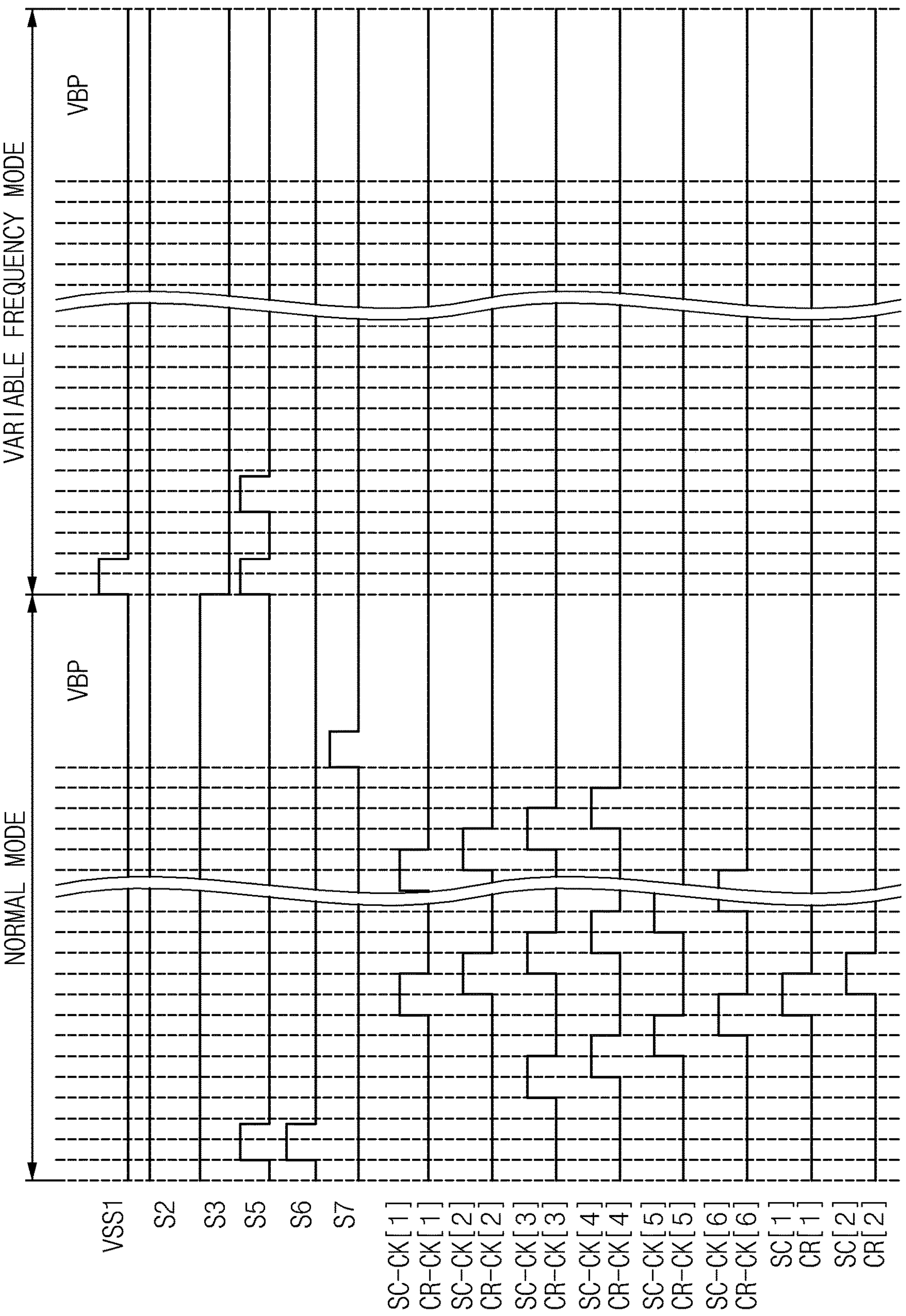
FIG. 14 is a timing diagram illustrating input signals, scan gate signals, and carry signals of the gate driving circuit of FIG. 13.
Figure 15:
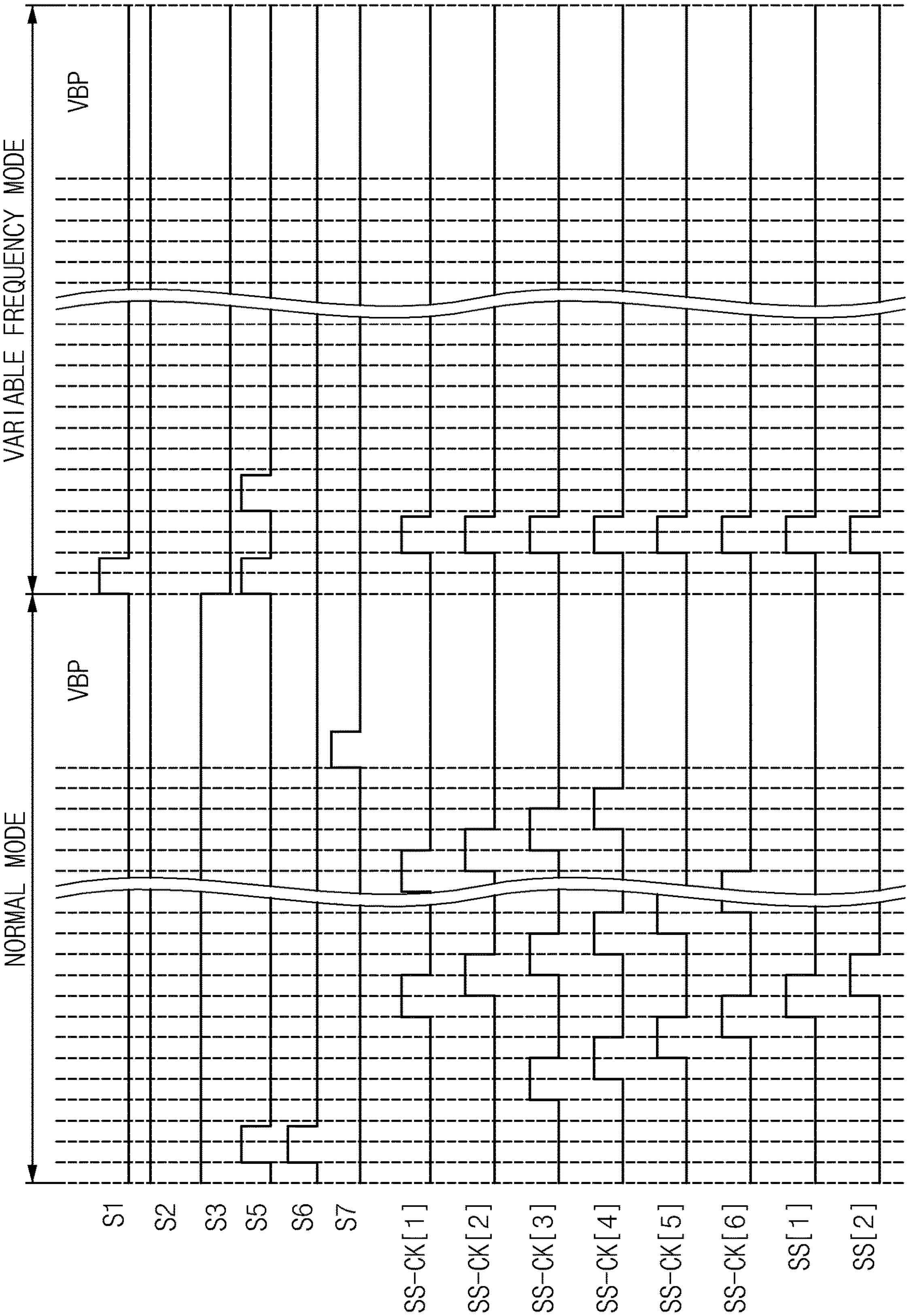
FIG. 15 is a timing diagram illustrating the input signals and sensing gate signals of the gate driving circuit of FIG. 13.

FIG. 13 is a circuit diagram illustrating another example of a gate driving circuit of an N-th stage of FIG. 4. FIG. 14 is a timing diagram illustrating input signals, scan gate signals, and carry signals of the gate driving circuit of FIG. 13. FIG. 15 is a timing diagram illustrating the input signals and sensing gate signals of the gate driving circuit of FIG. 13.

Referring to FIGS. 1 to 15, a gate driving circuit of FIG. 13 may be substantially the same as the gate driving circuit of the N-th stage STAGE[N] of FIG. 5 except that the 29-1 transistor T29-1, the 29-2 transistor T29-2, and the first signal S1 are not included unlike the gate driving circuit of the N-th stage STAGE[N] of FIG. 5. Therefore, redundant descriptions of the same or corresponding components will be omitted.

The gate driving circuit may include an N-th stage STAGE[N] outputting an N-th scan gate signal SC[N] based on a scan clock signal SC-CK, a voltage of a first node N1, and a voltage of a second node N2, output an N-th sensing gate signal SS[N] based on a sensing clock signal SS-CK, the voltage of the first node N1, and the voltage of the second node N2, and output an N-th carry signal CR[N] based on a carry clock signal CR-CK, the voltage of the first node N1, and the voltage of the second node N2. In this case, N may be a natural number.

In the variable frequency mode, the first low voltage VSS1 may have an activation pulse, and the sixth transistor T6 may not output the N-th scan gate signal SC[N] when the ninth transistor T9 outputs the N-th sensing gate signal SS[N] based on the sensing clock signal SS-CK, the voltage of the first node N1, and the voltage of the second node N2.

The N-th stage STAGE[N] may further include a resetter. The resetter may output the first low voltage VSS1 to the first node N1 in response to the fifth signal S5. As shown in FIGS. 14 and 15, the first low voltage VSS1 may have a low level in the normal mode, and may have an activation pulse in the variable frequency mode. In other words, a waveform of the first low voltage VSS1 of FIGS. 14 and 15 may be the same as a waveform of the first signal S1 of FIGS. 6 and 7. In the variable frequency mode, the fifth signal S5 may be a signal having an activation pulse. In other words, in the variable frequency mode, when the fifth signal S5 has a high level, the first low voltage VSS1 may be applied to the first node N1 by the resetter, and the voltage of the first node N1 may have a high level. Therefore, in the variable frequency mode, when the first low voltage VSS1 has the activation pulse, the fifth signal S5 may have the activation pulse.

During a period where the voltage of the first node N1 has the high level, a pulse of the N-th scan gate signal SC[N] may be output by the scan clock signal SC-CK of the N-th stage STAGE[N], a pulse of the N-th sensing gate signal SS[N] may be output by the sensing clock signal SS-CK of the N-th stage STAGE[N], and a pulse of the N-th carry signal CR[N] may be output by the carry clock signal CR-CK of the N-th stage STAGE[N].

The gate driver 300 may be configured such that the sensing clock signals SS-CK[1], SS-CK[2], . . . , SS-CK[6], SS-CK[1], . . . are simultaneously applied to the stages STAGE[1], STAGE[2], . . . , STAGE[6], STAGE[7], . . . after the activation pulse of the first low voltage VSS1. Therefore, the gate driver 300 may simultaneously apply the sensing gate signals SS[1], SS[2], . . . , SS[6], SS[7], . . . to pixel rows in response to the sensing clock signals SS-CK[1], SS-CK[2], . . . , SS-CK[6], SS-CK[1], . . . .

The gate driver 300 may be configured such that each of the scan clock signals SC-CK[1], SC-CK[2], . . . , SC-CK[6], SC-CK[1], . . . and the carry clock signals CR-CK[1], CR-CK[2], . . . , CR-CK[6], CR-CK[1], . . . has a low level in the variable frequency mode. Therefore, the scan gate signals SC[1], SC[2], . . . , SC[6], SC[7], . . . and the carry signals CR[1], CR[2], . . . , CR[6], CR[7], . . . may not be output.

The fifth signal S5 may be a signal having an activation pulse after the sensing gate signals SS[1], SS[2], . . . , SS[6], SS[7], . . . are simultaneously applied to the pixel rows in the variable frequency mode. The resetter may output the first low voltage VSS1 to the first node N1 in response to the fifth signal S5. When the fifth signal S5 has a high level, the first node N1 may be reset to the first low voltage VSS1 by the resetter.

In the variable frequency mode, the gate driver 300 may not apply the scan gate signal SC to the control electrode of the second pixel switching element PT2 when the sensing gate signal SS is applied to the control electrode of the first pixel switching element PT1.

In other words, as disclosed in FIG. 2, the sensing gate signal SS may be activated to turn on the third pixel switching element PT3, and the anode initialization operation of applying the initialization voltage VINT to the anode of the light emitting element EE may be performed. The light emitting element capacitor CE may be initialized or discharged by the anode initialization operation.

In order to reduce the luminance difference between the mutually different driving frequencies, according to the embodiments of the present disclosure, the display device 10 may be configured such that each of the pixels performs the anode initialization operation at a same frequency (e.g., at a maximum frequency of the variable frame frequency) regardless of the driving frequency. For example, the gate driver 300 may perform the anode initialization operation every shortest frame period among frame periods.

When the anode initialization operation is performed at the same frequency regardless of the driving frequency, light waveforms of the display panel 100 driven at the mutually different driving frequencies may have the same number of luminance valleys. Accordingly, an image may be displayed with a uniform luminance at the mutually different driving frequencies.

Figure 16:
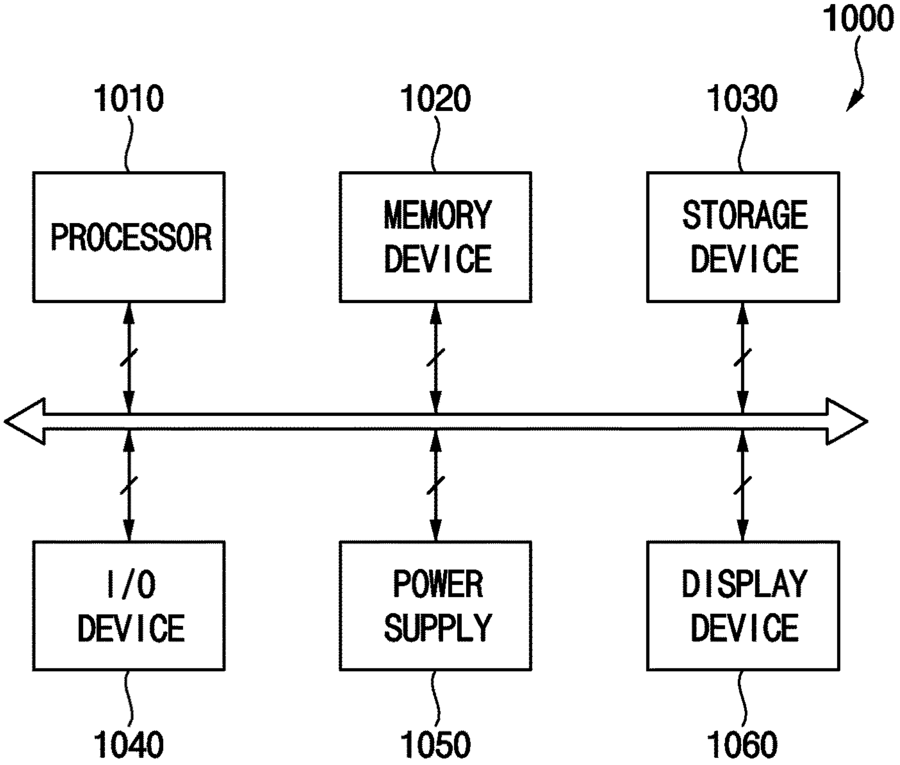
FIG. 16 is a block diagram illustrating an electronic device.
Figure 17:
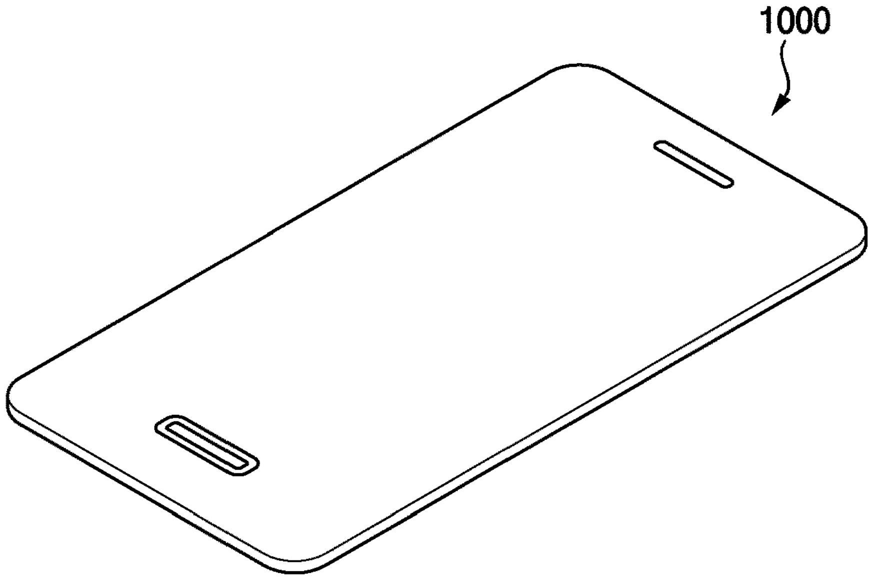
FIG. 17 is a diagram illustrating an embodiment in which the electronic device of FIG. 16 is implemented as a smart phone.

FIG. 16 is a block diagram illustrating an electronic device. FIG. 17 is a diagram illustrating an embodiment in which the electronic device of FIG. 16 is implemented as a smart phone.

Referring to FIGS. 16 and 17, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 17, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device comprising:

a display panel including pixels; and a gate driver configured to apply scan gate signals and sensing gate signals to the pixels, wherein the gate driver includes an N-th stage (where N is a natural number) configured to output an N-th scan gate signal among the scan gate signals based on a scan clock signal, a voltage of a first node, and a voltage of a second node, and output an N-th sensing gate signal among the sensing gate signals based on a sensing clock signal, the voltage of the first node, and the voltage of the second node, wherein the N-th stage includes a compensator, a sixth transistor including a control electrode connected to the first node, and a ninth transistor including a control electrode connected to the first node, and, wherein, in a variable frequency mode, the compensator outputs a second signal to the first node in response to a first signal, and the sixth transistor does not output the N-th scan gate signal when the ninth transistor outputs the N-th sensing gate signal based on the sensing clock signal, the voltage of the first node, and the voltage of the second node.

2. The display device of claim 1, wherein each of the pixels includes:

a first pixel switching element including a control electrode connected to a storage capacitor, a first electrode to which a first power supply voltage is applied, and a second electrode connected to a light emitting element;

a second pixel switching element including a control electrode to which the scan gate signal is applied, a first electrode to which a data voltage is applied, and a second electrode connected to the control electrode of the first pixel switching element; and a third pixel switching element including a control electrode to which the sensing gate signal is applied, a first electrode to which an initialization voltage is applied, and a second electrode connected to the light emitting element, wherein the light emitting element includes an anode connected to the second electrode of the first pixel switching element, and a cathode to which a second power supply voltage is applied, and wherein the storage capacitor includes a first electrode connected to the control electrode of the first pixel switching element, and a second electrode connected to the second electrode of the first pixel switching element.

3. The display device of claim 2, wherein, in the variable frequency mode, the gate driver does not apply the scan gate signal to the control electrode of the second pixel switching element when applying the sensing gate signal to the control electrode of the first pixel switching element.

4. The display device of claim 3, wherein the gate driver simultaneously applies the sensing gate signals to pixel rows in response to sensing clock signals.

5. The display device of claim 1, wherein the compensator includes a 29-1 transistor and a 29-2 transistor, wherein the 29-1 transistor includes a control electrode to which the first signal is applied, a first electrode connected to a second electrode of the 29-2 transistor, and a second electrode connected to the first node, and wherein the 29-2 transistor includes a control electrode to which the first signal is applied, a first electrode to which the second signal is applied, and the second electrode connected to the first electrode of the 29-1 transistor.

6. The display device of claim 5, wherein the second signal is applied to the first node when the 29-1 transistor and the 29-2 transistor are turned on in response to the first signal.

7. The display device of claim 1, wherein the N-th stage further includes a resetter, and wherein the resetter outputs a first low voltage to the first node in response to a fifth signal.

8. A display device comprising:

a display panel including pixels; and a gate driver configured to apply scan gate signals and sensing gate signals to the pixels, wherein the gate driver includes an N-th stage (where N is a natural number) configured to output an N-th scan gate signal among the scan gate signals based on a scan clock signal, a voltage of a first node, and a voltage of a second node, and output an N-th sensing gate signal among the sensing gate signals based on a sensing clock signal, the voltage of the first node, and the voltage of the second node, wherein the N-th stage includes a compensator, a sixth transistor including a control electrode connected to the first node, and a ninth transistor including a control electrode connected to the first node, and, wherein, in a variable frequency mode, the compensator outputs a first signal to the first node in response to the first signal, and the sixth transistor does not output the N-th scan gate signal when the ninth transistor outputs the N-th sensing gate signal based on the sensing clock signal, the voltage of the first node, and the voltage of the second node.

9. The display device of claim 8, wherein each of the pixels includes:

a first pixel switching element including a control electrode connected to a storage capacitor, a first electrode to which a first power supply voltage is applied, and a second electrode connected to a light emitting element;

a second pixel switching element including a control electrode to which the scan gate signal is applied, a first electrode to which a data voltage is applied, and a second electrode connected to the control electrode of the first pixel switching element; and a third pixel switching element including a control electrode to which the sensing gate signal is applied, a first electrode to which an initialization voltage is applied, and a second electrode connected to the light emitting element, wherein the light emitting element includes an anode connected to the second electrode of the first pixel switching element, and a cathode to which a second power supply voltage is applied; and wherein the storage capacitor includes a first electrode connected to the control electrode of the first pixel switching element, and a second electrode connected to the second electrode of the first pixel switching element.

10. The display device of claim 8, wherein the compensator includes a 29-1 transistor and a 29-2 transistor, wherein the 29-1 transistor includes a control electrode to which the first signal is applied, a first electrode connected to a second electrode of the 29-2 transistor, and a second electrode connected to the first node, wherein the 29-2 transistor includes a control electrode to which the first signal is applied, a first electrode to which the first signal is applied, and the second electrode connected to the first electrode of the 29-1 transistor, wherein an intermediate node of the 29-1 transistor and the 29-2 transistor is connected to an output electrode of a stabilizer, wherein the stabilizer includes a 28-1 transistor and a 28-2 transistor, wherein the 28-1 transistor includes a control electrode connected to the first node, a first electrode connected to a second electrode of the 28-2 transistor, and a second electrode connected to the output electrode of the stabilizer to which the intermediate node of the 29-1 transistor and the 29-2 transistor is connected, and wherein the 28-2 transistor includes a control electrode connected to the first node, a first electrode to which a second signal is applied, and the second electrode connected to the first electrode of the 28-1 transistor.

11. The display device of claim 8, wherein the compensator includes a 29-1 transistor and a 29-2 transistor, wherein the 29-1 transistor includes a control electrode to which the first signal is applied, a first electrode connected to a second electrode of the 29-2 transistor, and a second electrode connected to the first node, wherein the 29-2 transistor includes a control electrode to which the first signal is applied, a first electrode to which the first signal is applied, and the second electrode connected to the first electrode of the 29-1 transistor, and wherein a second signal is applied to an intermediate node of the 29-1 transistor and the 29-2 transistor.

12. The display device of claim 11, wherein the compensator further includes a 30-1 transistor and a 30-2 transistor, wherein the 30-1 transistor includes a control electrode connected to a second electrode of the 30-2 transistor, a first electrode connected to the second electrode of the 30-2 transistor, and a second electrode connected to the intermediate node of the 29-1 transistor and the 29-2 transistor, and wherein the 30-2 transistor includes a control electrode to which the second signal is applied, a first electrode to which the second signal is applied, and the second electrode connected to the first electrode of the 30-1 transistor.

13. The display device of claim 8, wherein the gate driver sequentially applies the sensing gate signals to pixel rows in response to sensing clock signals.

14. A display device comprising:

a display panel including pixels; and a gate driver configured to apply scan gate signals and sensing gate signals to the pixels, wherein the gate driver includes an N-th stage (where N is a natural number) configured to output an N-th scan gate signal among the scan gate signals based on a scan clock signal, a voltage of a first node, and a voltage of a second node, and output an N-th sensing gate signal among the sensing gate signals based on a sensing clock signal, the voltage of the first node, and the voltage of the second node, wherein the N-th stage includes a resetter configured to output a first low voltage to the first node in response to a fifth signal, a sixth transistor including a control electrode connected to the first node, and a ninth transistor including a control electrode connected to the first node, and, wherein, in a variable frequency mode, the first low voltage has an activation pulse, and the sixth transistor does not output the N-th scan gate signal when the ninth transistor outputs an N-th sensing gate signal based on the sensing clock signal, the voltage of the first node, and the voltage of the second node.

15. The display device of claim 14, wherein each of the pixels includes:

a first pixel switching element including a control electrode connected to a storage capacitor, a first electrode to which a first power supply voltage is applied, and a second electrode connected to a light emitting element;

a second pixel switching element including a control electrode to which the scan gate signal is applied, a first electrode to which a data voltage is applied, and a second electrode connected to the control electrode of the first pixel switching element; and a third pixel switching element including a control electrode to which the sensing gate signal is applied, a first electrode to which an initialization voltage is applied, and a second electrode connected to the light emitting element;

wherein the light emitting element includes an anode connected to the second electrode of the first pixel switching element, and a cathode to which a second power supply voltage is applied; and wherein the storage capacitor includes a first electrode connected to the control electrode of the first pixel switching element, and a second electrode connected to the second electrode of the first pixel switching element.

16. The display device of claim 15, wherein, in the variable frequency mode, the gate driver does not apply the scan gate signal to the control electrode of the second pixel switching element when applying the sensing gate signal to the control electrode of the first pixel switching element.

17. The display device of claim 16, wherein the gate driver simultaneously applies the sensing gate signals to pixel rows in response to sensing clock signals.

18. The display device of claim 14, wherein the resetter includes a 1-1 transistor and a 1-2 transistor, wherein the 1-1 transistor includes a control electrode to which the fifth signal is applied, a first electrode connected to the first node, and a second electrode connected to a first electrode of the 1-2 transistor, and wherein the 1-2 transistor includes a control electrode to which the fifth signal is applied, the first electrode connected to the second electrode of the 1-1 transistor, and a second electrode to which the first low voltage is applied.

19. The display device of claim 14, wherein, in the variable frequency mode, the fifth signal has an activation pulse.

20. The display device of claim 19, wherein, in the variable frequency mode, the fifth signal has an activation pulse when the first low voltage has the activation pulse.

* * * * *